United States Patent [19]
Kawashima et al.

[11] Patent Number: 4,972,000
[45] Date of Patent: Nov. 20, 1990

[54] HOLLOW POLYMER PARTICLES, PROCESS FOR PRODUCTION THEREOF, AND USE THEREOF AS PIGMENT

[75] Inventors: Nobuo Kawashima; Fujio Sakurai; Hiroshi Tadenuma, all of Yokkaichi, Japan

[73] Assignee: Japan Synthetic Rubber Co., Ltd., Tokyo, Japan

[21] Appl. No.: 314,929

[22] Filed: Feb. 24, 1989

[30] Foreign Application Priority Data

Feb. 29, 1988 [JP] Japan ................................ 63-44282
Sep. 30, 1988 [JP] Japan ............................. 63-246395
Sep. 30, 1988 [JP] Japan ............................. 63-246396

[51] Int. Cl.$^5$ ..................... C08J 9/26; C08J 9/224; C08F 265/04; C08F 265/06
[52] U.S. Cl. ........................................ 521/54; 521/55; 521/57; 521/134; 525/902; 428/407
[58] Field of Search .............. 427/222; 428/407, 35.7, 428/35.9; 521/134, 54, 55, 57; 525/902

[56] References Cited

U.S. PATENT DOCUMENTS

| | | | |
|---|---|---|---|
| 3,787,522 | 1/1974 | Dickie et al. | 525/902 |
| 3,819,542 | 6/1974 | Kreider | 264/41 |
| 3,819,577 | 6/1974 | McRowe | 524/413 |
| 3,914,338 | 10/1975 | Krieg et al. | 525/902 |
| 3,976,821 | 8/1976 | Carrow et al. | 521/54 |
| 4,005,033 | 1/1977 | Georgeau et al. | 521/134 |
| 4,303,729 | 12/1981 | Torobin | 428/407 |
| 4,387,138 | 6/1983 | Gift | 428/407 |
| 4,427,836 | 1/1984 | Kowalski et al. | 525/301 |
| 4,468,498 | 8/1984 | Kowalski et al. | 525/301 |
| 4,508,875 | 4/1985 | Kishida et al. | 525/902 |
| 4,521,568 | 6/1985 | Mori et al. | 525/902 |
| 4,582,756 | 4/1986 | Niinuma et al. | 428/407 |
| 4,594,363 | 6/1986 | Blankenship et al. | 525/902 |
| 4,677,003 | 6/1987 | Redlich et al. | 525/902 |
| 4,829,102 | 5/1989 | Biale | 525/902 |
| 4,849,480 | 7/1989 | Antonelli et al. | 525/902 |
| 4,863,973 | 9/1989 | Chip et al. | 521/134 |
| 4,880,842 | 11/1989 | Kowalski et al. | 521/134 |
| 4,885,320 | 12/1989 | Biale | 525/902 |
| 4,920,160 | 4/1990 | Chip et al. | 521/134 |

FOREIGN PATENT DOCUMENTS

| | | |
|---|---|---|
| 455277 | 3/1982 | Australia . |
| 888129 | 6/1981 | Canada . |
| 0203724 | 3/1986 | European Pat. Off. . |
| 6524 | 5/1971 | Japan . |
| 32513 | 1/1981 | Japan . |
| 167490 | 7/1982 | Japan . |
| 77394 | 8/1982 | Japan . |
| 223873 | 12/1983 | Japan . |

Primary Examiner—Maurice J. Welsh
Assistant Examiner—Rabon Sergent
Attorney, Agent, or Firm—Wenderoth, Lind & Ponack

[57] ABSTRACT

Hollow polymer particles having at least two polymer layers, wherein (1) the particles have an average particle diameter in the range of 0.15 to 20 micrometers, (2) each of the particles has an average equivalent hollow diameter/equivalent particle diameter in the range of 0.2 to 0.8, (3) the proportion of a toluene-insoluble portion of the particles is 20 to 90% by weight, (4) the polymer particles have a melt flow rate at 180° C. under 10 kgf/cm$^2$ of 0.1 to 1 g/10 min., (5) the inside layer of the two polymer layers is composed of a crosslinked polymer and (6) the outside layer of the two polymer layers is composd of a non-crosslinked polymer. This invention also provides hollow crosslinked polymer particles wherein the proportion of a toluene-insoluble portion of the particles exceeds 85% by weight, the melt flow rate of the polymer particles at 180° C. under 10 kgf/cm$^2$ is less than 0.2 g/10 min., and the outside layer is composed of a crosslinked polymer. The hollow polymer particles are useful, for example, as a pigment, and for a paper coating composition and a general-purpose coating composition.

27 Claims, No Drawings

HOLLOW POLYMER PARTICLES, PROCESS FOR PRODUCTION THEREOF, AND USE THEREOF AS PIGMENT

This invention relates to a hollow polymer particle of a novel structure composed of at least two polymer layers and having voids therein, a process for production thereof, and its use as a pigment. Such hollow polymer particles are useful as coating agents for paper, fibers and leathers, and light scattering agents, light scattering aids or microcapsules in various paints.

Polymer particles having voids are used as microcapsule particles by including various substances in the interior voids, or as an organic material such as hollow polymer particles used as a light scattering agent.

The following methods have been known for the production of polymer particles having voids.

(I) A method in which a blowing agent is included in polymer particles and then the blowing agent is decomposed to make foams (Canadian Patent No. 888,129).

(II) A method in which a volatile substance such as butane is included in a polymer, and later, the volatile substance is gasified and to expand the polymer (Japanese Laid-Open Patent Publication No. 252635/1985).

(III) A method in which a polymer is melted, and a gas jet such as an air jet is blown into the molten polymer to include bubbles.

(IV) A method in which a volatile base permeates polymer particles and then their inner alkali-swellable is swollen (U.S. Pat. No. 4,468,498).

(V) A method in which a w/o/w monomer emulsion is prepared and polymerized (Japanese Laid-Open Patent Publication No. 193901/1984).

(VI) A method in which a monomer is polymerized in a suspension obtained by suspending a pigment in an unsaturated polyester solution (Australian Patent No. 455277).

(VII) A two-step crosslinking method in which crosslinked polymer particles are used as a seed, and a polymer having different compatibility is formed by polymerization and crosslinking on the seed (Japanese Laid-Open Patent Publications Nos. 62510/1986 and 66710/1986).

(VIII) A method in which a void is separated when monomers change to a polymer particle by the difference of density between the polymer and its monomers (Japanese Laid-Open Patent Publications Nos. 87734/1986, 86941/1986, 127336/1987 and 156387/1987).

In recent years, there has been a tremendous increase in the demand of paper used in offset printing and gravure printing. Coated paper for offset printing is required to have excellent gloss before and after printing, and coated paper for use in gravure printing is required to have good dot reproducibility and excellent gloss on printing. To improve the above properties required of coated papers for printing offers a good print finish, and markedly increases the merchandize value of the coated papers.

Kaolin and clay have been widely used as a pigment for incorporation in paper coating compositions because the resulting coated paper has excellent gloss and printing adaptability. Titanium dioxide is also used as a white pigment for increasing the whiteness and non-transparency of coated papers. Coated paper obtained by using a paper coating composition containing titanium oxide is inferior to one obtained by using a titanium dioxide-free coating composition. Japanese Patent Publication No. 6524/1971 describes that when a mixture of organic pigments having a particle diameter of 0.3 to 0.8 micron is used in a paper coating composition, the gloss of paper before and after printing can be improved. This method however, has the defect that the whiteness and non-transparency of paper are inferior. Thus, the prior art shows no paper coating composition which makes it possible to produce coated paper having excellent whiteness and non-transparency as well as excellent gloss, strength and printing adaptability.

In order to prepare a coating composition of a high solids content, heavy calcium carbonate having a great effect of improving the flowability of the coating composition recently came into use as a mixture with kaolin or clay. Since there is a tendency to make paper neutral, it is anticipated that heavy calcium carbonate will be used more in future. The combined use of heavy calcium carbonate as a pigment, however, gives rise to a problem of imparing dot reproducibility and gloss after printing which are the important characteristics in gravure printing or offset printing. Various attempts have been made to solve this problem arising from the use of heavy calcium carbonate. Japanese Laid-Open Patent Publications Nos. 167490/1982 and 77394/1982 disclose that when an alkali-sensitive copolymer latex is used as a pigment binder (adhesive) in combination with heavy calcium carbonate used as one pigment, the above problem is obviated and high rigidity and good dot reproducibility or gloss after printing can be imparted to coated paper. However, with the improvement of only the pigment binder, there is a limit to the increase of the amount of heavy calcium carbonate based on the total amount of the pigments, and this improvement is insufficient for achieving increased coating operability and providing a coating composition of a high solids content.

On the other hand, the use of polymer particles containing minute voids as a hiding agent or a hazing agent in paints and molding compositions has been suggested heretofore.

U.S. Pat. No. 3,819,542 describes an empirical interest which shows that the use of an organic solvent in a latex paint composition forms a cellular film on drying, although this patent has no disclosure on the formation of minute void-containing polymer particles functioning as a hazing agent in a paint composition. More specifically, this patent shows the use of a mixture of a primary organic solvent (for example, xylene) immiscible with the aqueous phase of the latex paint composition and a secondary organic solvent (for example, propylene glycol) being at least partially immiscible with water and having lower volatility and solvating ability than the primary solvent with respect to the polymer in the latex. The cellular film is obtained by the evaporation of the primary solvent, and the secondary solvent increases its opacity.

U.S. Pat. No. 3,819,577 states that a vesiculated polymer is prepared by converting to a solid polymer a liquid medium containing dispersed therein particles of another polymer swollen with a liquid swellant, and by coating the composition on a substrate, formation of a coated film and formation of water-containing vesicular by the removal of the swellant from the swollen and dispersed polymer occur simultaneously.

These paint compositions have a hiding effect, but give films having inferior gloss and strength. Moreover, they require devices for discharging or recovering expensive solvents which involve a risk of health and fire hazards.

Canadian Patent No. 888,129 discloses a two step latex dispersing method for a core-containing particulate material having a blowing agent and a sheathed layer. The particulate material is heated to evolve a gas, and foamed. It is difficult, however, to form uniform minute voids by this method, and a tough film cannot be obtained.

U.S. Pat. No. 3,914,338 discloses a method of producing opalescent polymer particles comprising a cross-linked styrene emulsion polymer having a particle diameter of at least 0.8 micron and formed thereon by emulsion polymerization a sheath of a methyl methacrylate polymer. The opalescence is attributed to the difference in refractive index between the core and the sheath. The hiding effect of the opalescent polymer particles obtained by this method does not surpass that obtained by minute voids.

Australian Patent No. 455,277 discloses a water-base paint composition based on beads-like resin particles obtained by suspending an aqueous dispersion of a pigment as liquid droplets in a solution of an unsaturated polyester containing an unsaturated monomer such as styrene, dispersing the resulting suspension in the form of beads in water, then polymerizing the monomer, and stabilizing the polymer by adding a water-soluble polymer such as partially hydrolyzed polyvinyl acetate. This composition was improved by using an unsaturated polyester resin having a polyethylene oxide chain and omitting the addition of the water-soluble polymer (see Japanese Laid-Open Patent Publication No. 129485/1976). These paint compositions, however, have the defect of giving a film having hiding property but inferior gloss.

Japanese Laid-Open Patent Publication No. 32513/1981 discloses a paint composition comprising an aqueous dispersion of core-shell polymer particles containing at least 5% by weight of an unsaturated carboxylic acid monomer in the core and not more than 10% by weight of it in the shell in which the shell component is permeable to a volatile base such as ammonia or an organic amine and the core has the property of being swollen by neutralization. This patent document states that in the water-base paint composition, the core-shell polymer particles functions as a binder or as part of the binder; and that when in use, the composition is neutralized at least partly (to pH 6 at the lowest) by using the volatile base, the polymer particles control the paint composition rheologically, and during the drying of the paint composition, voids are formed in the core of the swollen particles in the film. The polymer particles function as an opacifying agent. To form minute voids by this method, the glass transition temperature Tg of the shell should be set at room temperature or above, preferably at least 50° C., and it is difficult to cause the polymer particles function as a binder or as part of it within the coated film. If the Tg of the shell is prescribed at room temperature or at a higher temperature, the shell cannot retain its outer configuration and collapses in the step of removing the volatile base and water from the core of the swollen particles during drying of the paint composition. Accordingly, minute voids are difficult to form, and it is difficult to make the polymer particles function as an opacifying agent. For this reason, it is difficult for the polymer particles to have a dual function of the opacifying agent and part of the binder.

Japanese Laid-Open Patent Publication No. 223873/1983 proposes a method of making a core/shell resin emulsion having voids inside as a result of cross-linking both the core and shell components for use as an opacifying agent for a water-base paint. However, the voids inside the core/shell polymer particles obtained by this method are very small, and are non-film-forming at room temperature. When such polymer particles are used in a water-base paint composition, the composition gives a film having gloss but a low hiding effect. Furthermore, since the polymer particles do not have a binder function, the strength of the coated film becomes low.

The prior manufacturing methods discussed above are difficult of producing polymer particles having the desired inside voids or of controlling the manufacturing conditions. Conventional hollow fine particles have hiding property which is required when they are added as a light scattering agent to a film-forming substance. But they have an inferior balance of properties such as gloss, strength, elasticity, adhesion, water resistance, alkali resistance, solvent resistance and weatherability. The conventional methods of producing polymer particles having inside voids require the use of a polymer having a high glass transition temperature as a shell. This has the serious drawback that hollow polymer particles having good adhesion cannot be obtained.

It is an object of this invention to provide novel hollow polymer particles.

Another object of this invention is to provide hollow polymer particles having excellent hiding property and a well balanced combination of gloss, film strength, elasticity, adhesion, water resistance, alkali resistance, solvent resistance and weatherability.

Still another object of this invention is to provide hollow polymer particles having excellent adhesion which cannot be obtained by the prior art.

Yet another object is to provide an industrially advantageous process for producing the novel hollow polymer particles of the invention.

A further object of this invention is to provide a pigment having excellent properties reflecting the above excellent properties of the hollow polymer particles of the invention.

A still further object of this invention is to provide a paper coating composition comprising the hollow polymer particles which can give coated paper having excellent whiteness, opacity, gloss before and after printing, strength and printing adaptability.

A yet further object of this invention is to provide a paper coating composition having a high content of heavy calcium carbonate for providing high solids content, which gives coated paper having excellent gloss, and printing adaptability in gravure printing and offset printing while taking advantage of the excellent flowability characteristics of the heavy calcium carbonate.

An additional object of this invention is to provide a general-purpose coating composition containing the hollow polymer particles of the invention.

Other objects of the invention along with its advantages will become apparent from the following description.

The above objects and advantage of the invention are firstly achieved by hollow polymer particles having at least two polymer layers, wherein (1) the particles have an average particle diameter in the range of 0.15 to 20 micrometers, (2) each of the particles has an average equivalent hollow diameter/equivalent particle diameter in the range of 0.2 to 0.8, (3) the proportion of a toluene-insoluble portion of the particles is 20 to 90% by weight, (4) the polymer particles have a melt flow rate at 180° C. under 10 kgf/cm² of 0.1 to 1 g/10 min., (5) the inside layer of the two polymer layers is composed of a crosslinked polymer composed of (a) recurring units represented by the following formula

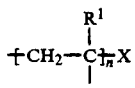

(a)

wherein $R^1$ represents a hydrogen atom or a methyl group, X represents an n-functional organic group or a bond, and n is a number of 2 or 3, provided that n $R^1$'s may be identical or different and when X is a bond, n is 2, (b) recurring units represented by the following formula

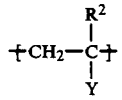

(b)

wherein $R^2$ represents a hydrogen atom or a methyl group, and Y represents a phenyl group, a phenyl group substituted by halo, alkyl or vinyl, a halogen atom, a cyano group, an alkanoyloxy group having 1 to 18 carbon atoms, an alkoxy group, a pyridyl group, a pyridylalkyl group, an aminoalkoxy group or an amide group, (c) recurring units represented by the following formula

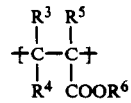

(c)

wherein $R^3$ and $R^5$ are identical or different, and each represents a hydrogen atom or a methyl group, $R^4$ represents a hydrogen atom, a carboxyl group or a carboxylate group, and $R^6$ represents a hydrogen atom, an alkyl group having 1 to 18 carbon atoms, a hydroxyalkyl group having 2 to 10 carbon atoms, an organic group containing at least one member selected from a glycidyl group, an amino group, a cyano group and a carbon-carbon double bond, or one equivalent of a cation group, and (d) optionally, recurring units represented by the following formula

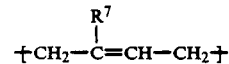

(d)

wherein $R^7$ represents a hydrogen atom or a methyl group, and (6) the outside layer of the two polymer layers is composed of a non-crosslinked polymer composed of at least one type of recurring units selected from the recurring units of formulae (b), (c) and (d). According to this invention, the above hollow polymer particles (Q) can be produced by subjecting hollow polymer particles having an average particle diameter in the range of 0.05 to 15 micrometers [to be sometimes referred to as hollow pre-polymer particles (P)], and at least one monomer selected from the group consisting of monomers represented by the following formula

(b1)

wherein $R^2$ and Y are as defined above with regard to formula (b), monomers represented by the following formula

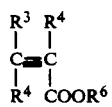

(c1)

wherein $R^3$, $R^4$, $R^5$ and $R^6$ are as defined above with regard to formula (c), and monomers represented by the following formula $$CH_2=CR^7-CH=CH_2 \qquad (d1)$$

wherein $R^7$ is as defined above with regard to formula (d)

to polymerization in an aqueous medium, preferably at a pH of less than 7, in the presence of not more than 5 parts by weight, per 100 parts by weight of the hollow pre-polymer particle (P) and the monomer combined, of an emulsifier and/or a dispersing agent.

Examples of the monomer of formula (b1) include aromatic vinyl monomers such as styrene, alpha-methylstyrene, p-methylstyrene, ethylstyrene, vinyltoluene, halogenated styrene and vinylnaphthalene; alpha-olefins such as propylene, 1-butene, 1-pentene, 1-hexene, 2-methyl-1-pentene and 4-methyl-1-pentene; vinyl halides such as vinyl fluoride and vinyl bromide; vinyl cyanide compounds such as acrylonitrile and methacrylonitrile; vinyl esters of organic acids such as vinyl acetate, vinyl propionate and vinyl stearate; vinyl ethers such as vinyl methyl ether, vinyl ethyl ether and vinyl isobutyl ether; acrylamide-type monomers such as acrylamide, methacrylamide and N-methylol methacrylamide; alkenylpyridines such as vinylpyridine and propenylpyridine; and aminoalkyl vinyl ethers such as aminoethyl vinyl ether and dimethylaminoethylvinyl ether.

Examples of the monomers represented by formula (c1) include unsaturated mono- or di-carboxylic acids and anhydrides thereof, such as acrylic acid, methacrylic acid, crotonic acid, maleic acid, fumaric acid and itaconic acid; esters of (meth)acrylic acid such as methyl acrylate, ethyl acrylate, butyl acrylate, 2-ethylhexyl acrylate, methyl methacrylate, butyl methacrylate and lauryl methacrylate; monoesters or diesters of dicarboxylic acids such as monomethyl itaconate and dimethyl maleate; hydroxyalkyl esters of ethylenically unsaturated carboxylic acids such as 2-hydroxyethyl acrylate, 2-hydroxypropyl (meth)acrylate and betahydroxyethyl (meth)acrylate; amino group-containing alkyl esters of ethylenically unsaturated carboxylic acids such as methylaminoethyl (meth)acrylate and dimethylaminopropyl (meth)acrylate; cyano group-containing alkyl esters of ethylenically unsaturated carboxylic acids such as cyanomethyl acrylate and 2-cyanoethyl acrylate; aminoalkylamides of ethylenically unsaturated carboxylic acids such as methylaminoethyl (meth)acrylamide and dimethylaminoethyl (meth)acrylamide; and glycidyl esters of ethylenically unsaturated carboxylic acids such as glycidyl (meth)acrylate.

Examples of the monomers of formula (d1) are aliphatic conjugated diene monomers such as 1,3-butadiene, 2-methyl-1,3-butadiene and 2-chloro-1,3-butadiene.

Examples of the monomers of formula (a1) to be described hereinafter are divinyl monomers or trivinyl monomers such as divinylbenzene, butadiene, isoprene, ethylene glycol dimethacrylate, 1,3-butylene glycol dimethacrylate, trimethylol propane trimethacrylate and allyl methacrylate. Divinylbenzene, ethylene glycol dimethacrylate and trimethylolpropane trimethacrylate are especially preferred.

Production of hollow pre-polymer particle (P)

The hollow pre-polymer particles (P) used in the above method is composed of recurring units of formulae (a), (b) and (c) and optionally (d) and has an average particle diameter in the range of 0.05 to 15 micrometers.

The hollow pre-polymer particles (P) can be conveniently produced, for example, by the methods proposed in Japanese Laid-Open Patent Publications Nos. 62510/1986 and 66710/1986 [the prior art (VII) discussed above] and the methods proposed in Japanese Laid-Open Patent Publications Nos. 87734/1986, 86941/1986, 127336/1987 and 156387/1987 [the prior art discussed in (VIII) above]. The use of hollow pre-polymer particles obtained by these methods makes it possible to produce the hollow polymer particles (Q) having especially superior hiding property. Particularly, according to the methods of (VIII), the inside and outside diameters of the resulting hollow pre-polymer particles (P) can be easily controlled. By using the resulting hollow prepolymer particles (P), hollow polymer particles of the invention can be produced which have excellent solvent resistance and heat resistance as well as excellent hiding property. Hence, the methods of (VIII) are especially preferred. The method disclosed in Japanese Laid-Open Patent Publication No. 127336/1987 is most preferred, and can achieve excellent polymerization stability and productivity in the polymerization of the hollow polymer particle precursor.

According to this invention, the hollow prepolymer particles (P) can be produced by polymerizing 100 parts of a monomeric mixture (m−1) composed of a monomer represented by the following formula

wherein $R^1$, X and n are as defined hereinabove with regard to formula (a),
the monomer of formula (b1), the monomer of formula (c1) and optionally the monomer of formula (d1) in the presence of 1 to 100 parts by weight of particles of another polymer [to be sometimes referred to as a dissimilar polymer (S)] having a different composition from the polymer obtained from the monomeric mixture in an aqueous medium. The dissimilar polymer (S) differs from the polymer obtained from the monomeric mixture (m−1), and is preferably one which can be readily dissolved in, or swollen with, the above monomeric mixture.

Specific examples of the dissimilar polymer include polystyrene, carboxy-modified polystyrene, carboxy-modified styrene/butadiene copolymer, styrene/butadiene copolymer, styrene/acrylic ester copolymers, styrene/methacrylic ester copolymers, acrylic ester copolymers, methacrylic ester copolymers, carboxy-modified styrene/acrylic ester copolymers, carboxy-modified styrene/methacrylic ester copolymers, carboxy-modified acrylic ester copolymers and carboxy-modified methacrylic ester copolymers. Of these, polystyrene and styrene copolymers containing at least 50% by weight of a styrene component are preferred.

In the polymerization, 1 to 100 parts by weight, preferably 2 to 50 parts by weight, of the dissimilar polymer is used per 100 parts by weight of the monomeric mixture (m−1). If the amount of the dissimilar polymer (S) is less than 1 part by weight, the effect of forming inside voids is small. If it exceeds 100 parts by weight, the formation of the internal voids tends to be inhibited. Hence, amounts outside the specified range are undesirable.

Especially preferably, the above method of producing the hollow pre-polymer particles (P) is carried out by using a monomeric mixture composed of 1 to 80% by weight of the monomer (a1), 20 to 99% by weight of a hydrophilic monomer selected from the monomers (b1) and (c1) and 0 to 70% by weight of another copolymerizable monomer selected from the monomers (b1), (c1) and (d1), the amounts being based on the total weight of the monomers (a1), (b1), (c1) and (d1).

Examples of the hydrophilic monomer selected from the monomers (b1) and (c1) include vinylpyridine, glycidyl acrylate, glycidyl methacrylate, methyl acrylate, ethyl acrylate, methyl methacrylate, acrylonitrile, acrylamide, methacrylamide, N-methylolacrylamide, N-methylolmethacrylamide, acrylic acid, methacrylic acid, itaconic acid, fumaric acid, sodium styrenesulfonate, vinyl acetate, dimethylaminoethyl methacrylate, diethylaminoethyl methacrylate, 2-hydroxyethyl methacrylate and 2-hydroxypropyl methacrylate. Of these, the unsaturated carboxylic acids such as methacrylic acid, methyl methacrylate, vinylpyridine and 2-hydroxyethyl methacrylate are preferred. Preferably, the hydrophilic monomer has a solubility in water of at least 0.5% by weight, especially at least 1% by weight.

The other monomer copolymerizable with the above monomers and selected from (b1), (c1) and (d1) is not particularly limited. Preferably, the above exemplified aromatic vinyl compounds, ethylenically unsaturated carboxylic acid alkyl esters, vinyl cyanide compounds and aliphatic conjugated dienes are preferred. Styrene and alkyl (meth)acrylates having an alkyl group with at least 2 carbon atoms are preferred.

Especially preferably, the monomeric mixture (m−1) is composed of 2 to 60% by weight of the monomer (a1) (crosslinkable monomer), 40 to 98% by weight of the hydrophilic monomer selected from the monomers (b1) and (c1), and 0 to 70% by weight of the other monomer selected from the monomers (b1), (c1) and (d1).

If the amount of the hydrophilic monomer is too small, phase separation of the dissimilar polymer (S) is insufficient or the dissimilar polymer is exposed on the surface of the polymer particles. Thus, the formation of inside voids tends to be unsure. If the amount of the crosslinkable monomer is too small, the strength of the particles during polymerization becomes insufficient and the particles will be entirely shrunken. The distortion of the inside of the particles by polymerization shrinking is insufficient and inside voids fail to be formed. Even when polymer particles having inside voids are formed, the strength of the shell tends to decrease.

On the other hand, if the amount of the cross-linkable monomer is too large, there arises a tendency for the dissimilar polymer to be excluded outwardly of the polymer particles formed during polymerization. As a result, the polymer particles are not completely spherical, but become irregularly-shaped agglomerated particles.

Preferred embodiments of producing the hollow polymer particle precursor (P) are the following methods (A) and (B) which are based on the polymerization technique disclosed in Japanese Laid-Open Patent Publication No. 127336/1987.

(A) A method in which a monomeric mixture and as required, an oily substance are caused to be absorbed by fine particles of a dissimilar polymer (seed polymer), and then the monomeric mixture is polymerized.

(B) A method in which a dissimilar polymer is dissolved in a monomeric mixture and as required, an oily substance to form an oily solution, the oily solution is finely dispersed in water to form an oil-in-water emulsion, and then the monomeric mixture is polymerized.

The presence of the oily substance together with the dissimilar polymer makes it easy to control the diameter of the inside voids of the polymer particles.

When the dissimilar polymer (S) is used in the form of particles by the method (A) above, it functions as seed polymer particles, and absorbs the monomeric mixture and the oily substance. Preferably, therefore, the dissimilar polymer has good absorbability of the monomeric mixture and the oily substance. Accordingly, it is preferred to use dissimilar polymers having a low molecular weight, for example a number average molecular weight of not more than 20,000, preferably not more than 10,000, more preferably 700 to 7,000. The number average molecular weight, as used herein, is a value calculated for polystyrene. It is obtained by dissolving the dissimilar polymer in a good solvent therefor and subjecting the solution to gel permeation chromatography (GPC).

If the number average molecular weight of the dissimilar polymer is higher than 30,000, the proportion of the monomers unabsorbed by the seed polymer particles increases, the unadsorbed momomers tend to be polymerized separately to form fine void-free polymer particles in a large amount. Moreover, the polymerization system becomes unstable.

The particle diameter of the dissimilar polymer used as seed polymer particles are preferably 0.3 to 0.8 times the outside diameter of the desired hollow polymer particle precursor (P).

There is no particular restriction on a method of producing the dissimilar polymer used as seed polymer particles. For example, it may be produced by an emulsion- or suspension-polymerization method using a relatively large amount of a chain transfer agent.

The ability of the dissimilar polymer as seed polymer particles to absorb the monomeric mixture and the oily substance can be increased by causing the seed polymer particles to absorb a highly oleophilic substance having a solubility in water of not more than $10^{-3}\%$ by weight. If such a means of causing the seed polymer particles to absorb the highly oleophilic substance is employed, favorable results can be obtained even if the number average molecular weight of the dissimilar polymer exceeds 20,000.

The particle diameter of the hollow polymer particle precursor (P) having inside voids obtained by using the seed polymer particles nearly coincides with the particle diameter of the seed polymer particles which have increased in size as a result of absorbing the polymerizable monomer and the oily substance. Accordingly, the particle diameter of the hollow pre-polymer particle having inside voids can be controlled by adjusting the particle diameter of the seed polymer particles, the amount of the seed polymer used relative to the monomeric mixture and the oily substance.

Specifically, by using seed polymer particles having a particle diameter of 0.06 to 0.40 micrometer in the production of the hollow pre-polymer particles (P) having inside voids, there can be obtained hollow prepolymer particles having a particle diameter of 0.1 to 0.6 micrometer and excellent whiteness and hiding power.

Another advantage of using the seed polymer particles is that in the production of polymer particles containing inside voids and having a small particle diameter of not more than 1 micrometer, monomer liquid droplets of a small particle diameter can be formed easily and stably.

When the dissimilar polymer is to be produced by the method (B), its molecular weight is not particularly limited, and is preferably at least 20,000.

In the method (B), an oily substance may be used as required. It may be any oleophilic substance which has a solubility in water of not more than 0.2% by weight. Examples may include vegetable oils, animal oils, mineral oils and synthetic oils. The hollow prepolymer particle having inside voids may be obtained by the method (B) even without using the oily substance. However, the diameter of the inside voids can be surely controlled by using the oily substance and adjusting its amount, etc.

Specific examples of the oily substance include lard, olive oil, coconut oil, castor oil, cottonseed oil, kerosene, benzene, toluene, xylene, butane, pentane, hexane, cyclohexane, carbon disulfide and carbon tetrachloride.

High-boiling oils such as eugenol, geraniol, cyclamen aldehyde, citronellal, dioctyl phthalate and i-butyl phthalate may also be used as the oily substance. The use of these high-boiling oils leads to capsular polymer particles containing a perfume, a plasticizer, etc. in the core.

The amount of the oily substance is usually 0 to 1,000 parts by weight, preferably 0 to 300 parts by weight, per 100 parts by weight of the monomeric mixture. Inert solvents usually contained in crosslinkable monomer materials may also be considered as the oily substance. If the amount of the oily substance is excessively large, the amount of the monomer components becomes relatively insufficient. As a result, the shell of the polymer becomes thinner, and the strength of the capsules becomes insufficient and is susceptible to collapse.

The concept of the oily substance can also include the monomers (a1), (b1), (c1) and (d1) already described above. In this case, the polymerization is stopped while the monomers remain in the inside of the polymer particles formed, and the remaining monomers can be used as the oily substance. At this time, the polymerization yield should be limited to not more than 97%, preferably 95%, and for this purpose it is possible to employ a method in which the polymerization is carried out in the presence of a small amount of a polymerization inhibitor, a method in which the temperature of the reaction system is lowered during the polymerization, or a method in which during the polymerization, a polymerization stopper is added to stop the polymerization.

According to the method (B), hollow pre-polymer particles having spaces inside can be obtained by separating the capsular polymer particles containing the oily substance or hydrous hollow polymer particles obtained by substituting water for the oily substance as mentioned above from the aqueous dispersion and drying them.

The hollow pre-polymer particles (P) obtained by using the above polymerization techniques have the following advantages.

(i) The manufacturing process is simple and has excellent productivity.

(ii) The production control is easy, and hollow pre-polymer particles having the desired inside and outside diameters can be obtained.

(iii) Since the pH of the aqueous dispersion of the hollow pre-polymer particle can be freely selected, a wide range of monomers can be used to form a polymer coating on the surface of hollow pre-polymer fine particles.

(iv) The hollow polymer particles of this invention obtained by using the hollow pre-polymer particles (P) produced by the above polymerization techniques as the hollow pre-polymer particles (P) in the process of this invention shows very superior hiding property, gloss, adhesion and film strength.

According to this invention, hollow pre-polymer particles (P) having an average particle diameter of 0.05 to 15 micrometers, preferably 0.15 to 10 micrometers, can be advantageously produced by the methods described above.

Particles with an average particle diameter of less than 0.05 micrometer are difficult to produce. Even if they can be produced, they undesirably contain a minor proportion of void-free polymer particles. On the other hand, if the outside diameter exceeds 15 micrometers, the particle size distribution become broad and the hollow polymer particles obtained by using the hollow prepolymer particles (P) do not have a uniform particle diameter.

The ratio of the inside diameter to the outside diameter of the hollow pre-polymer particles (P) is preferably from 0.25 to 0.9. If the ratio is at least 0.25, hollow polymer particles of the invention having very superior properties can be obtained. On the other hand, if it exceed 0.9, hollow pre-polymer particles (P) are difficult to produce, and the process is undesirable for commercial production.

The hollow pre-polymer particles (P) preferably has a toluene-insoluble portion at room temperature of at least 80% by weight, and its glass transition temperature Tg is at least 150° C., or is immeasurable.

The hollow pre-polymer particles (P) in this invention have the composition of a crosslinked polymer composed of recurring units (a), (b), (c) and optionally (d).

According to the preferred method described above, there can be obtained hollow pre-polymer particles (P) preferably composed of (i) 100 parts by weight of a crosslinked polymer composed of 20 to 99% by weight of hydrophilic recurring units selected from recurring units (b) and (c), 1 to 80% by weight of recurring units (a) and 0 to 70% by weight of other copolymerizable recurring units selected from recurring units (b), (c) and (d), the proportions being based on the total weight of the recurring units (a), (b), (c) and (d), and (ii) 1 to 100 parts by weight of a polymer (S) having a different composition from the above copolymer.

More preferably, the component (i) is composed of 40 to 98% by weight of the hydrophilic recurring units, 2 to 60% by weight of recurring units (a) and 0 to 70% by weight of the other copolymerizable recurring units.

There is no particular limitation on the type of the hydrophilic recurring units in the component. Preferably, they are derived from an unsaturated carboxylic acid and/or another hydrophilic monomer.

More preferably, the hydrophilic recurring units are composed of 1 to 70% by weight of units derived from the unsaturated carboxylic acid and 30 to 99% by weight of units derived from the other hydrophilic monomer.

By using the hollow pre-polymer particles (P) having the preferred or more preferred component (i), the invention can produce hollow polymer particles (Q) having very superior properties intended by this invention.

Production of hollow polymer particles (Q)

The hollow polymer particles (Q) of this invention can be produced by subjecting a mixture of the hollow pre-polymer particles (P) and at least one monomer (m−2) selected from the monomers (b1), (c1) and (d1) to polymerization in an aqueous medium, preferably at a pH of less than 7, in the presence of not more than 5 parts by weight, per 100 parts by weight of the hollow prepolymer particles (P) and the monomer (m−2) combined, of an emulsifier and/or a dispersing agent.

The monomers (b1), (c1) and (d1) may be the same as those described above with regard to the hollow pre-polymer particles (P). Compounds of formula (b1) in which Y is a phenyl group or an alkyl-substituted phenyl group are preferred as the monomer (b1) as the (m−2) component. Examples are aromatic vinyl monomers such as styrene and p-methylstyrene, vinyl cyanide compounds such as acrylonitrile, vinyl halides such as vinyl fluoride, vinyl esters of organic acids such as vinyl acetate and amide monomers such as acrylamide. Styrene is especially preferred as the monomer (b1).

The amount of the monomer (b1) used is preferably 0 to 99.5% by weight, more preferably 10 to 99.5% by weight, especially preferably 20 to 99.5% by weight based on the total amount of the components (m−2) because of the light-scattering property and gloss which the units from the monomer (b1) impart to the hollow polymer particles (Q).

Examples of preferred monomers (c1) as the (m−2) component include unsaturated mono- or di-carboxylic acids such as acrylic acid, methacrylic acid and itaconic acid; (meth)acrylic ester monomers such as methyl (meth)acrylate, ethyl (meth)acrylate, butyl (meth)acrylate and 2-ethylhexyl (meth)acrylate; mono- or di-esters of dicarboxylic acids such as monomethyl itaconate and dimethyl maleate; hydroxyalkyl esters of ethylenically unsaturated carboxylic acids such as 2-hydroxyethyl (meth)acrylate; and glycidyl esters of ethylenically unsaturated carboxylic acids such as glycidyl (meth)acrylate. (Meth)acrylic acid, itaconic acid, methyl (meth)acrylate, ethyl (meth)acrylate, butyl (meth)acrylate, 2-ethylhexyl (meth)acrylate and 2-hydroxyethyl (meth)acrylate are especially preferred.

The amount of the monomer (c1) used is preferably 0.5 to 100% by weight, more preferably 0.5 to 90% by weight, especially preferably 0.5 to 80% by weight, based on the total weight of the components (m−2).

It is preferable to use compounds of (c-1) in which $R^6$ is a hydrogen atom and/or $R^4$ is a carboxyl group, for example an unsaturated carboxylic acid such as (meth)acrylic acid or itaconic acid in an amount of preferably 0.5 to 50% by weight, more preferably 1 to 40% by weight, especially preferably 2 to 30% by weight, based on the total weight of the components (m−2) because this leads to good polymerization stability.

An unsaturated carboxylic acid monomer having a molecular weight at least 100 per carboxyl group in the molecule may be used as part of the monomer (c1). Examples of the unsaturated carboxylic acid monomer are shown below by general formulae. The use of such an unsaturated carboxylic acid brings about a further improvement in the strength and adhesion of the resulting hollow polymer particles. This unsaturated carboxylic acid can be used in an amount of up to 20% based on the monomer (c1).

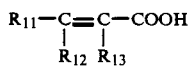

(1)

wherein $R_{11}$, $R_{12}$ and $R_{13}$ each represent H or an alkyl group having 1 to 20 carbon atoms.

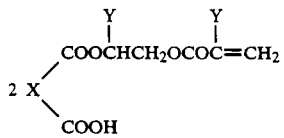

(2)

wherein X represents an aromatic group or a cycloalkyl group, such as

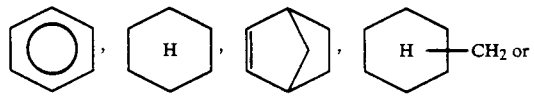

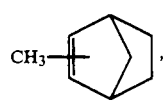

and Y is hydrogen or methyl.

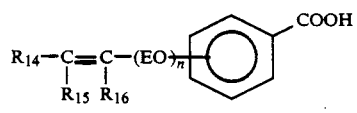

(3)

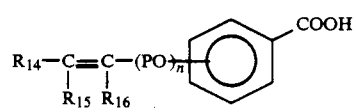

(4)

In the formulae (3) and (4), each of $R_{14}$, $R_{15}$ and $R_{16}$ represents hydrogen or an alkyl group having 1 to 12 carbon atoms; EO represents an ethylene oxide group; and PO represents a propylene oxide.

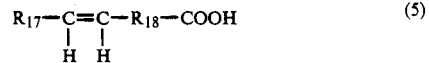

(5)

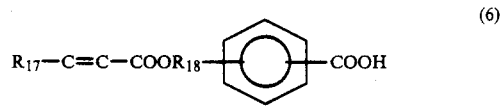

(6)

In the two formulae (5) and (6), each of $R_{17}$ and $R_{18}$ represents hydrogen or an alkyl group having 1 to 20 carbon atoms. Of these higher carboxylic acid monomers, the following monomers are especially preferred.

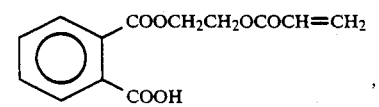

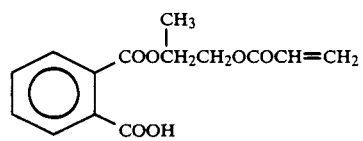
, and

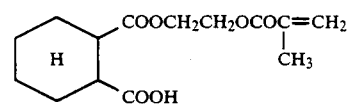

1,3-Butadiene is especially preferred as the monomer (d1). The amount of the monomer (d1) is preferably 0 to 3% by weight, more preferably 0 to 60% by weight, especially preferably 0 to 50% by weight, based on the total weight of the components (m−2). The use of the monomer (d1) is preferred because it gives hollow polymer particles (Q) of the invention having a well-balanced combination of strength, adhesion, weatherability, light resistance and thermal resistance.

The Tg of the copolymer derived from the monomeric mixture (m−2) for use in the production of the hollow polymer particles (Q) of the invention is preferably 40° to 150° C. by calculation. Where strength, adhesion and pigment bindability are strongly required of the particles, this copolymer especially preferably has a Tg of 40° to 100° C. by calculation. Where gloss and light scattering property are strongly required, it especially preferably has a Tg of 70° to 150° C. by calculation.

The polymerization is carried out in the presence of not more than 5 parts by weight, per 100 parts of the hollow pre-polymer particles (P) and the monomer mixture (m−2−) combined, of an emulsifier and/or a dispersing agent in an aqueous medium preferably at a pH of less than 7. A polymeric film of the monomer or monomeric mixture (m−2) is formed on the surface of the hollow pre-polymer particles (P) is formed to give hollow polymer particles (Q) of the invention having an average particle diameter of 0.015 to 20 micrometers.

In the polymerization step, the monomer or monomeric mixture (m−2) may be added and polymerized, for example, by a method in which the hollow prepolymer particles (P) and the monomer or monomer mixture (m−2) are mixed with stirring and polymerized or an increment polymerization method in which the monomeric mixture (m−2) is continuously or dividedly fed into the polymerization system and polymerized. The increment polymerization method is preferred in order to copolymerize the polymerizable monomer on the surface of the hollow pre-polymer particles efficiently and stably.

The emulsifier and/or the dispersing agent (suspension protecting agent) may be anionic, nonionic, cationic or amphoteric emulsifiers and/or dispersing agents which may be used singly or in combination.

Examples of the emulsifiers include rosinic acid salts such as potassium rosinate and sodium rosinate; sodium or potassium salts of saturated or unsaturated higher aliphatic carboxylic acids such as potassium oleate, potassium laurate, sodium laurate, sodium stearate and potassium stearate; salts of sulfuric acid esters of aliphatic alcohols such as sodium laurylsulfate; anionic emulsifiers, for example alkylarylsulfonic acid salts such as sodium dodecylbenzenesulfonate, sodium dialkylsulfosuccinates and formaldehyde condensate salts of naphthalenesulfonic acids; and nonionic emulsifiers such as alkyl esters, alkyl ethers or alkylphenyl ethers of polyethylene glycol. Of these, sodium laurylsulfate, sodium dodecylbenzenesulfonate, sodium dioctylsulfosuccinate, formaldehyde condensate salts of naphthalenesulfonic acid and alkylphenyl ethers of polyethylene glycol are preferred.

Quaternary ammonium salts may be used as cationic emulsifiers. When a cationic emulsifier is used in an aqueous dispersion, it is used alone or in combination with a nonionic emulsifier.

Examples of the dispersing agent include hydrophilic synthetic polymeric substances such as polyacrylic acid, polymethacrylic acid, polyvinyl sulfonic acid, polyvinyl alcohol, polyvinyl pyrrolidone and polyethylene glycol; natural hydrophilic polymeric substances such as gelatin and water-soluble starch and hydrophilic semisynthetic polymeric substances such as carboxymethyl cellulose.

The amount of the emulsifier and/or the dispersing agent is not more than 5 parts by weight, preferably not more than 2 parts by weight, more preferably not more than 1 part by weight, per 100 parts by weight of the monomeric mixture (m−2). If it exceeds 5 parts by weight, the efficiency of producing the hollow polymer particles (Q) of the invention is reduced, and their hiding property and gloss are deteriorated, owing to the occurrence of new particles during the polymerization.

The polymerization may be carried out in the presence of a polymerization initiator. Examples of the polymerization initiator include redox-type initiators composed of combinations of organic hydroperoxides typified by cumene hydroperoxide, diisorpopylbenzene hydroperoxide and p-methane hydroperoxide with reducing agents typified by sugar-containing pyrophosphoric acid, a sulfoxylate or a sugar-containing pyrophosphoric acid/sulfoxylate mixture; persulfates such as potassium persulfate and ammonium persulfate; and azobisisobutyronitrile, benzoyl peroxide and lauroyl peroxide.

Preferred are persulfates (such as potassium persulfate and ammonium persulfate), azobisisobutyronitrile, benzoyl peroxide and a combination of benzoyl peroxide and a reducing agent. The persulfates are especially preferred. With these polymerization initiators, radicals readily gather on the surface of the hollow pre-polymer particles (P), a film of the components (m−2) is efficiently formed. The amount of the polymerization initiator is preferably 0.05 to 2 parts by weight, more preferably 0.05 to 0.8 part by weight, per 100 parts by weight of the hollow pre-polymer particles and the monomer or monomeric mixture (m−2) combined. If the polymerization initiator is used in an amount within this range, hollow polymer particles (Q) having excellent water resistance and alkali resistance can be obtained.

Usually temperatures of 5° to 95° C. are suitable as the polymerization temperature. Preferably, the polymerization temperature is 50° to 90° C.

As required, a chain transfer agent may be used in the polymerization. Examples of the chain transfer agent include mercaptans such as t-dodecylmercaptan, octylmercaptan, n-tetradecylmercaptan, octylmercaptan and t-hexylmercaptan, and halogen-containing compounds such as carbon tetrachloride and ethylene bromide.

In the emulsion polymerization in accordance with this invention, the pH of the polymerization system, to not a small extent, affects polymerization stability and the particle size distribution and the inside diameter/outside diameter ratio of the hollow polymer particles (Q) of this invention. If the pH is less than 7, the above property and dimensional characteristics are good, and the desired hollow polymer particles (Q) can be obtained. If the pH exceeds 7 and the monomeric mixture (m−2) does not contain a polymerizable unsaturated carboxylic acid, the above property and dimensional characteristics are good. If, however, the monomeric mixture (m−2) contains the polymerizable unsaturated carboxylic acid in this case, the polymerization stability tends to be reduced.

An aqueous dispersion of hollow fine polymer particles produced by the method disclosed in the above cited Japanese Laid-Open Patent Publication No. 12733/1987 has a pH of less than 7. The use of this aqueous dispersion as the hollow pre-polymer particles (P) is very desirable since the monomers for a polymer to be formed on the surface of the hollow fine polymer particles can be selected from a wide range.

Thus, the present invention provides hollow polyme particles having at least two polymer layers, wherein (1) the particles have an average particle diameter in the range of 0.15 to 20 micrometers, (2) each of the particles has an average equivalent hollow diameter/equivalent particle diameter in the range of 0.2 to 0.8, (3) the proportion of a toluene-insoluble portion of the particles is 20 to 90% by weight, (4) the polymer particles have a melt flow rate at 180° C. under 10 kgf/cm$^2$ of 0.1 to 1 g/10 min., (5) the inside layer of the two polymer layers is composed of a crosslinked polymer consisting of the above units of formulae (a), (b), (c) and optionally (d), and (6) the outside layer is composed of a non-crosslinked polymer consisting of at least one type of units selected from the group consisting of units of formulae (b), (c) and (d).

The average particle diameter of the hollow polymer particles (Q) of this invention is in the range of 0.15 to 20 micrometers. If it is less than 0.15 micrometer, the hollow particles have inferior hiding property when used as a light scattering aid. If it is more than 20 micrometers, polymerization stability is poor, and new particles attributed only to the monomer (m−2) occur during polymerization. Accordingly, the desired hiding property cannot be balanced with gloss and other properties.

Preferably, the average particle diameter of the hollow polymer particles (Q) of this invention is in the range of 0.2 to 2 micrometers.

The average ratio of the equivalent hollow diameter to the equivalent particle diameter for each particle is in the range of 0.2 to 0.8. If this ratio is less than 0.2, the hollow polymer particles considerably deteriorated hiding property. If it exceeds 0.8, the balance of the hiding property with the adhesion, gloss and strength of the hollow polymer particles becomes inferior.

Preferably, this ratio is between 0.4 and 0.75. The equivalent hollow diameter denotes the diameter of a hollow portion calculated as a sphere. Likewise, the equivalent particle diameter denotes the diameter of a particle regarded as a solid particle which is calculated as a sphere. The average value of this ratio is calculated on fifty particles selected at random.

The proportion of a toluene-insoluble portion in the hollow polymer particles (Q) is 20 to 90% by weight, preferably 20 to 80% by weight. The hollow polymer particles (Q) have a melt flow rate, measured at 180° C. under a load of 10 kgf/cm$^2$, of 0.1 to 1 g/10 min., preferably 0.1 to 0.8 g/10 min.

The outside layer of the hollow polymer particles (Q) of this invention contain at least one type of recurring units selected from recurring units (b), (c) and (d). Preferably, it is composed of a non-crosslinked polymer consisting of 0 to 99.5% by weight of the units (b), 0.5 to 100% by weight of the units (c) and 0 to 80% by weight of the units (d), the proportions being based on the total weight of the units (b), (c) and (d).

Preferably, the non-crosslinked polymer contains 0.5 to 50% by weight of the units of formula (c) in which $R^6$ is a hydrogen atom and/or $R^4$ is a carboxyl group, or 20 to 99.5% by weight of the units of formula (b) in which Y is a phenyl group or an alkyl-substituted phenyl group.

The proportion of the inside layer is 5 to 2,000 parts by weight, preferably 10 to 1,000 parts by weight, per 100 parts by weight of the outside layer.

The outside layer preferably has a Tg of 40° to 150° C., and the Tg of the inside layer does not exist below 150° C.

The hollow polymer particles (Q) have a portion soluble in tetrahydrofuran, and preferably contains 1 to 80% by weight, based on the total weight of the portion dissolved in tetrahydrofuran, of a component having a number average molecular weight of 700 to 20,000 in the molecular weight distribution of the tetrahydrofuran-soluble portion measured by high-performance liquid chromatography for its tetrahydrofuran solution.

Second hollow polymer particles (Q') of the invention

Secondly, the objects and advantages of the invention are achieved by hollow polymer particles having at least two polymer layers, wherein (1) the particles have an average particle diameter in the range of 0.15 to 20 micrometers, (2) each of the particles has an average equivalent hollow diameter/equivalent particle diameter in the range of 0.2 to 0.8, (3) the proportion of a toluene-insoluble portion of the particles exceeds 85% by weight, (4) the polymer particles have a melt flow rate at 180° C. under 10 kgf/cm$^2$ is less than 0.2 g/10 min., (5) the inside layer of the two polymer layers is composed of a crosslinked polymer consisting of the above units of formulae (a), (b), (c) and optionally (d), and (6) the outside layer is composed of a crosslinked polymer composed of recurring units of formula (a) and optionally recurring units selected from the group consisting of units of formulae (b), (c) and (d).

The second hollow polymer particles (Q') differ from the above hollow polymer particle (Q) in that the outside layer is also composed of a crosslinked polymer. As a result, the proportion of the toluene-insoluble portion is relatively large (above 85% by weight), and the melt flow rate is relatively low (below 0.2 g/10 min.).

In principle, the second hollow crosslinked polymer particle (Q') can be produced in the same way as the hollow polymer particles (Q). Specifically, the hollow crosslinked polymer particles can be produced by subjecting (A) hollow pre-polymer particles having the same particle diameter and composition as the hollow pre-polymer particles (P) used in the production of the hollow polymer particles (Q) and (B) the monomer of formula (a1) above and optionally at least one monomer selected from the monomers of formulae (b1), (c1) and (d1) [to be referred to as the "monomers (m−2)'"] to polymerization in the presence of not more than 5 parts by weight, per 100 parts by weight of the hollow pre-polymer particles (A) and the monomers (B) combined, of an emulsifier and/or a dispersing agent to polymerization in an aqueous medium, and thereby forming a polymer film of the monomers (m−2)' on the surface of the hollow pre-polymer particles (A) to form hollow polymer particles having an average particle diameter of 0.15 to 20 micrometers.

This method is the same as the method of producing the hollow polymer particles (Q) except that the monomers used for producing the polymer of the outside layer are different.

It should be understood that the above description of the method of producing the hollow polymer particles (Q) applies equally to the method of producing the hollow crosslinked polymer particles (Q)' if the monomers (m−2)' is read for the monomer (m−2).

The monomer of formula (a1) and optionally at least one of the monomers of the formulae (b1), (c1) and (d1) are used as the monomers (m−2)'.

The amount of the monomer (a1) used is preferably 0.5 to 100% by weight, preferably 0.5 to 99.5% by weight, especially preferably 1 to 99.5% by weight, based on the total weight of the monomers (m−2)'. If the monomer (a1) is divinylbenzene, it is preferably used in an amount of 0.5 to 95% by weight, especially 2 to 80% by weight. This amount of the monomer (a1) is preferred in view of the thermal resistance and solvent resistance of the hollow polymer particles (Q)' of the invention.

The amount of the monomer (b1) used is 0 to 99.5% by weight, preferably 5 to 98% by weight, especially preferably 20 to 96% by weight, based on the total weight of the monomers (m−2)'.

The amount of the monomer (c1) used is 0 to 99.5% by weight, preferably 1 to 94% by weight, especially preferably 2 to 80% by weight, based on the total weight of the monomers (m−2)'.

A compound of formula (c1) in which $R^6$ is a hydrogen atom and/or R is a carboxyl group, an unsaturated carboxylic acid such as (meth)acrylic acid or itaconic acid is used in an amount of preferably 0 to 50% by weight, more preferably 1 to 40% by weight, especially preferably 2 to 30% by weight, based on the total weight of the (m−2)' components. This is desirable because it leads to good polymerization stability.

The amount of the monomer (d1) is preferably 0 to 80% by weight, more preferably 0 to 60% by weight, especially preferably 0 to 50% by weight, based on the total weight of the components (m−2)'. The above-specified amount is desirable because it gives a good balance among strength, adhesion, weatherability, light resistance and thermal resistance.

The average particle diameter of the hollow polymer particles (Q)' of this invention is in the range of 0.15 to 20 micrometers. If it is less than 0.15 micrometer, the hollow particles have inferior hiding property when used as a light scattering aid. If it is more than 20 micrometers, polymerization stability is poor, and new particles attributed only to the monomers (m−2)' occur during polymerization. Accordingly, the desired hiding property cannot be balanced with gloss and other properties. Preferably, the average particle diameter of the hollow polymer particles (Q)' of this invention is in the range of 0.2 to 2 micrometers.

The average ratio of the equivalent hollow diameter to the equivalent particle diameter for each particle is in the range of from 0.2 to 0.8. If this ratio is less than 0.2, the hollow polymer particles have considerably deteriorated hiding property. If it exceeds 0.8, the balance of the hiding property with the adhesion, gloss and strength of the hollow polymer particles becomes inferior. Preferably, this ratio is between 0.4 and 0.75.

The definitions of the equivalent hollow diameter and the equivalent particle diameter are as given hereinabove.

The proportion of a toluene-insoluble portion in the hollow polymer particles (Q)' is more than 85% by weight, preferably more than 85% by weight, if it is 85% or less, the solvent resistance and thermal resistance of the resulting polymer particles (Q)' are inferior. The hollow polymer particles (Q)' have a melt flow rate, measured at 180° C. under a load of 10 kgf/cm$^2$, of less than 0.2 g/10 min., preferably less than 0.1 g/10 min. If the flow rate is 0.2 g/10 min. or more, the solvent resistance and thermal resistance are likewise deteriorated.

The outside layer of the hollow crosslinked polymer particles (Q)' of this invention is composed of the recurring units (a) and optionally at least one of the recurring units (b), (c) and (d). Preferably, this outside layer is composed of a crosslinked polymer consisting of 0.5 to 99.5% by weight of the recurring units (a), 0 to 99.5% by weight of the recurring units (b), 0.5 to 99.5% by weight of the recurring units (c) and 0 to 80% by weight of the recurring units (d).

Preferably, the crosslinked polymer contains 0.5 to 50% by weight of the recurring units of formula (c) in which $R^6$ is a hydrogen atom and/or $R^4$ is a carboxyl group, or 20 to 99.5% by weight of the recurring units of formula (b) in which Y is a phenyl group or an alkyl-substituted phenyl group.

The proportion of the inside layer of the polymer is preferably 5 to 2,000 parts by weight, more preferably 10 to 1,000 parts by weight, per 100 parts by weight of the outside layer.

The hollow crosslinked polymer particles (Q)' of the invention have a portion which dissolves in tetrahydrofuran. Preferably, it contains 20 to 95% by weight, based on the total weight of the portion dissolved in tetrahydrofuran, of a component having a number average molecular weight of 700 to 20,000 in the molecular weight distribution of the tetrahydrofuran-soluble portion measured by high-performance liquid chromatography for its tetrahydrofuran solution.

Utility of the hollow polymer particles (including both particles Q and Q')

The hollow polymer particles of this invention are produced by the above methods as an aqueous dispersion.

The solids content of the aqueous dispersion is not restricted, but usually it is preferably 10 to 65% in view of the solids contents of compositions used in various applications.

The presence of voids in the polymer particles in the aqueous dispersion can be determined by using a transmission-type electron microscope, or by measuring the specific gravity of the polymer particles.

The aqueous dispersion of the hollow polymer particles of the invention can be converted to a powder by drying the aqueous dispersion. For this purpose, general powderizing methods for aqueous dispersions can be used. For example, there may be used spray-drying at 130° to 180° C., ray drying in a hot air atmosphere at a temperature of, for example 50° to 70° C., and fluidized bed drying at room temperature to 70° C. The solids content of the aqueous dispersion before drying is preferably at least 20%. The particle diameter of the powder obtained is nearly equivalent to that of the aqueous dispersion used.

The hollow polymer particles of the invention and their aqueous dispersion shows an excellent balance among hiding property, gloss, adhesion, water resistance, solvent resistance and thermal resistance and therefore are useful as a plastic pigment. They can be used, for example, as paints, paper coating agents, ink, adhesives, tackifying agents, primers, leather finishing agents, additives for resins and rubbers, carpets, ventilating paints, metal coating agents, lubricants, sealants, can sealing agents, overcoating agents for thermosensitive recording sheets, and paper additives. By utilizing the enveloping ability of the polymer particles, it is possible to enclose various components, such as perfumes, medicines, agricultural chemicals, dyes, detergents, oils and fats, foods, enzymes, liquid crystals, rust-proofing agents, catalysts, fire retarding agents, antioxidants and adhesives by such means as dipping treatment under atmospheric, reduced or elevated pressure. According to the components contained inside, they may be used in various applications, for example, as medicines and cosmetics.

The hollow polymer particles of the invention are especially preferably used as pigments.

Advantageously, therefore, the present invention provides a coating composition, such as a paper coating composition or a general-purpose coating composition.

The paper coating composition of this invention comprises the hollow polymer particles of the invention, a mineral inorganic pigment and a pigment binder. In this composition, the hollow polymer particles account for 1 to 50% by weight of the total weight of the hollow polymer particles and the mineral inorganic pigment, and the amount of the pigment binder is 3 to 30 parts by weight per 100 parts by weight of the hollow polymer particles and the mineral inorganic pigment combined.

The components used in the paper coating composition of this invention will be described below.

(1) Mineral inorganic pigment

Examples include clay, talc, satin white, heavy calcium carbonate, precipitated calcium carbonate, titanium dioxide, zinc oxide, aluminum hydroxide and barium sulfate. The amount of the mineral inorganic pigment used in this invention is 50 to 99 parts by weight, preferably 70 to 97 parts by weight, per 100 parts by weight of the entire pigments. It is preferred to use 1 to 10 parts by weight of titanium dioxide in order to increase opacity and whiteness. For the purpose of securing good flowability when the solids content of the paper coating composition is increased, heavy calcium carbonate is preferably included in an amount of at least 15% by weight based on the entire pigments.

(2) Pigment binder

The pigment binder used in this invention may be any of binders used in ordinary paper coating compositions. Examples include natural binders such as starch, modified starch and casein, and synthetic binders such as a stryene/butadiene copolymer latex, a carboxy-modified styrene/butadiene copolymer latex, a polyvinyl acetate emulsion, an acrylic resin emulsion, a polychloroprene latex and polyvinyl alcohol. They may be used singly or in combination. Of these pigment binders, the styrene/butadiene copolymer latex and carboxy-modified styrene/butadiene copolymer latex either singly or in combination with natural binders such as starch and casein are preferred.

The amount of the pigment binder is 3 to 30 parts by weight per 100 parts by weight of the pigments. If it is less than 3 parts by weight, the pigment binder cannot produce a binding effect. On the other hand, if it exceeds 30 parts by weight, the viscosity of the coating composition increases, and its coating operability is reduced.

The paper coating composition of this invention may further include not more than 25% by weight, based on the total weight of the mineral inorganic pigment and the hollow polymer particles, of non-hollow polymer particles.

(3) Non-hollow polymer particles

Non-hollow polymer particles may be used in an amount of not more than 25% by weight (based on the entire pigments) together with the hollow polymer particles of this invention. The non-hollow polymer particles (pigment) are fine particles of polystyrene, polymethyl methacrylate, a carboxy-modified product of polystyrene or polymethyl methacrylate, a copolymer of styrene, a copolymer of methyl methacrylate, crosslinked products of these polymers, or polymers having a glass transition temperature of at least 60° C. These polymer particles may be produced, for example, by the methods disclosed in Japanese Patent Publication Nos. 25862/1972 (corresponding to U.S. Pat. No. 4,075,134), 125147/1976 (corresponding to U.S. Pat. No. 3,968,319) and 7964/1978 (corresponding to U.S. Pat. No. 3,873,345). The total amount of the hollow polymer particles and the non-hollow polymer particles is 1 to 50% by weight, preferably 3 to 30% by weight, based on the total amount of the pigments. If it is less than 1% by weight, they cannot produce the effect of a white pigment. If it exceeds 50% by weight, paper coated with the coating composition has inferior printing adaptability and strength. The proportion of the non-hollow polymer particles is 0 to 25 parts by weight for 1 to 50 parts by weight of the entire polymer particles, and is preferably equal to, or smaller than, the weight of the hollow polymer particles.

The paper coating composition of this invention is prepared by a customary method from the above components, and coated on a paper substrate by ordinary coating methods such as an air knife coating method, a blade coating method or a roll coating method.

The general-purpose coating composition of this invention comprises 3 to 95 parts by weight of the hollow polymer particles of the invention, 5 to 97 parts by weight of a pigment binder and 0 to 700 parts, per 100 parts by weight of the hollow polymer particles and the pigment binder combined, of an inorganic filler.

The components used in the general-purpose coating composition will be described below.

(1) Pigment binder

Any binders which can be binders for water-base paint compositions can be used. Examples include, vinyl resin emulsions, vinyl-type water-soluble resins, vinyl-type resin dispersions, celluloses such as hydroxyethyl cellulose and carboxymethyl cellulose, starch and casein. It is preferred to use acrylic or acrylic-styrene resin emulsions in view of the weatherability and strength of the resulting coated film. Preferably, the pigment binder has a toluene-insoluble portion of at least 30% and a Tg of at least −50° C. but below 40° C. If its toluene-insoluble portion is less than 30%, the solvent resistance and durability of the coated film are deteriorated. If the Tg is less than −50° C., the strength and staining resistance of the coated film are deteriorated. If the Tg is at least 40° C., the film-formability of the coating composition and the low temperature properties and temperature dependence of the coated film are deteriorated. The amount of this pigment binder is preferably 5 to 97 parts by weight, more preferably 10 to 95 parts by weight, especially preferably 30 to 90 parts by weight. If it is less than 5 parts by weight, the pigment has only an insufficient binding power and the resulting coating composition is difficult to form into a film. If it exceeds 97 parts, the resulting coated film has inferior hiding property.

(2) Inorganic filler

Examples of inorganic fillers that can be used in this invention include heavy calcium carbonate, precipitated calcium carbonate, clay, kaolin clay, kaolinite clay, sericite, bentonite, acid terra alba, precipitated barium sulfate, lithopone, talc, basic magnesium carbonate, barium carbonate, calcium silicate, gypsum, slaked lime, carbon black, diatomaceous earth, colloidal silica, asbestos, graphite, glass fibers, fiber powder, dolomite, zeolite, zinc flower, and titanium dioxide. The amount of the inorganic filler used is 0 to 700 parts by weight, preferably 0 to 600 parts by weight, more preferably 0 to 500 parts by weight. If it exceeds 700 parts by weight, the film formation from the resulting coating solution is insufficient, and the resulting coated film has deteriorated properties.

Preferably, in order to enhance hiding property, titanium dioxide is used as a hiding agent together with the hollow polymer particles of the invention. The hollow polymer particle/titanium dioxide ratio is preferably from 1/100 to 100/0, more preferably from 3/100 to 100/5, especially preferably from 5/100 to 100/10. This leads to a favorable balance among film properties such as hiding property, weatherability, water resistance and alkali resistance.

The general-purpose coating composition of this invention is prepared from the above-mentioned components in a customary manner and coated by an ordinary coating method.

As required, the paper coating composition and the general-purpose coating composition provided by this invention may further contain other paint additives. Examples of the paint additives include plasticizers or film-forming aids, for example carbitol, Cellosolve, butyl Cellosolve, butyl carbitol, carbitol acetate, Cellosolve acetate, butyl Cellosolve acetate, butyl carbitol acetate, Texanol CS-12 (a product of Chisso Corporation) and hexylene glycol, phthalic esters (such as dibutyl glycol phthalate, dibutyl phthalate and dioctyl phthalate), aliphatic dibasic acid esters (such as decyl succinate and diisopropyl succinate), glycol esters (such as ethylene glycol benzoate), chlorinated paraffins, and polyoxyethylene alkyl phenyl ethers; surface-active agents; dispersing agents for the inorganic fillers, such as salts of fused phosphoric acids (e.g., hexametaphosphoric acid and tripolyphosphoric acid) and salts of polycarboxylic acids; drying regulating agents such as mineral terpene; freeze stabilizing agents such as glycerol, ethylene glycol and propylene glycol; defoamers such as higher alcohols, polyethers and silicones; thickening agents; and antiseptics.

The general-purpose coating composition of the invention is prepared by mixing the hollow polymer particles, the pigment binder and the inorganic filler and optionally other additives. Preferably, the pH of the composition is adjusted to 7 or higher by using a pH adjusting agent such as sodium hydroxide and ammonia. At a pH of below 7, the dispersion stability of the composition is undesirably degraded.

The physical properties of the hollow polymer particles of this invention and the properties of a coated film prepared therefrom are measured by the following methods.

1. Particle diameter and inside void diameter

Measured from an electron micrograph of the sample taken by using a transmission-type electron microscope (JEM-100 SX made by Japan Electronics Industry Co., Ltd.).

2. MFT (minimum film-forming temperature)

Measured by using a thermal gradient-type film-forming temperature measuring device (made by Rigaku Kogyo Co., Ltd.).

3. Number average molecular weight (Sample preparation)

(1) An aqueous dispersion of polymer particles was treated with an ion-exchange resin (Amberlite IR120 produced by Organo Co., Ltd.) to adjust its pH to about 2.

(2) Tetrahydrofuran was added in a proportion of 30 ml per 100 mg of the polymer solids. The mixture was left to stand at room temperature for 24 hours to dissolve the polymer.

(3) The insoluble matter was removed by using a prefilter (AP25-1000 made by Japan Millipore Industry Co., Ltd.) and a microfilter (Microfilter FR-100 made by Fuji Film Co., Ltd.), and the remainder was further diluted with tetrahydrofuran to threefold to form a sample.

(Measuring conditions)

(1) Measuring instrument: High-performance liquid chromatograph HLC-802A made by Toyo Soda Co., Ltd.

(2) Column: TSK Gel G6000S-G6000S-G5000HS-G40000HS-G4000HS (3) Fluidizing solvent: tetrahydrofuran (4) Flow rate: 1.0 ml/min. (5) Pressure: 84 kg/cm$^2$ Under the above conditions, the number average molecular weight, calculated for polystyrene, of the sample was measured. 4. Toluene-insoluble portion (Procedure)

(1) The sample latex was dried on a glass plate.

(2) About 0.15 g of the dried polymer was taken into a 100 ml Erlenmeyer flask, and precisely weighed (A g).

(3) Fifty ml of toluene (solvent) was added by an autoburette, and the mixture was shaken at 60° C. for 30 minutes.

(4) The solution was filtered through a filter paper (Toyo Filter Paper No. 2, JIS P-3801). The filtrate was treated for 1 hour by an ultracentrifugal separator (55P-2 made by Hitachi Limited) at 23,000 rpm. (At this time, the polymer not dissolved in toluene precipitates, and the polymer dissolved in toluene was present in the transparent supernatant.)

(5) Ten milliliter of the supernatant was taken by a hole pipette, and poured into a precisely weighted aluminum dish (B g).

(6) The solvent was evaporated to dryness by a hot plate, and after cooling, the remaining polymer together with the aluminum dish was precisely weighed (C g).

(7) The proportion of the solvent-insoluble portion was calculated in accordance with the following equation.

$$\text{Toluene-insoluble portion (\%)} = 100 - \frac{(C - B) \times 5 \times 100}{A}$$

5. MFR (melt flow rate)

(Sample preparation)

An aqueous dispersion of polymer particles were dried on a glass plate to form a powder sample.

(Measuring conditions)

Measured in accordance with JIS K-7210.

(1) Measuring instrument: Melt indexer made by Takara Industry Co., Ltd.

(2) Temperature: 180° C.

(3) Load: 10 kgf

6. Hiding ratio

The coating composition was coated on a hiding ratio testing paper (produced by Nippon Test Panel Industry Co., Ltd.) by a 6-mil applicator, and dried for 5 days at 20° C. and a relative humidity of 60%. Then, the gloss at 45°/0° of the test paper was measured on its black and white portions by a Murakami-type glossmeter. The hiding ratio was calculated in accordance with the following formula (JIS K-5400).

$$\frac{\text{Hiding}}{\text{ratio}} = \frac{45°/0° \text{ diffusion reflectance of the coated film on a black portion}}{45°/0° \text{ diffusion reflectance of the coated film on a white portion}}$$

7. 60° specular gloss (glass plate)

The coating composition prepared was left to stand for 1 day and then coated on a glass plate by a 3-mil applicator and dried for 5 days at a temperature of 20° C. and a relative humidity of 60%. The specular gloss was measured by a Murakami-type glossmeter.

8. Water resistance

The coated film formed on the glass plate in 7 above was dried for one day, and immersed in water at room temperature for 14 days. Then, the coated film was visually observed, and rated on the following scale.

◎: No swelling nor blistering on the film.

○: No swelling but slight blistering on the film.

Δ: Swelling of the film, and slight blistering.
X: Large swelling and much blistering on the film.
9. Solvent resistance The coated film on the glass plate as prepared in 7 above was dried for one day, and immersed in toluene at room temperature for 24 hours. Then, the coated film was observed visually, and rated on the following standards.

○ : Swelling, but no blistering on the film.
Δ: Swelling and slight blistering on the film.
X: Large swelling and much blistering.

10. Thermal resistance

The coated film on the glass prepared in 7 above is put in an incubator kept at 100° C. and left to stand for one day. Then, it is left to stand indoors for one hour, and the film was visually observed, and rated on the following standards.

○ : No swelling nor blistering on the film.
Δ: No swelling but blistering on the film.
X: Swelling and blistering on the film.

11. Adhesion

The coating composition prepared was coated twice (200 g/cm²) on a flexible plate by a brush, and dried for 5 days. Cuts were provided by a razor on the surface of the dried film to form a pattern of many squares each side measuring 2 mm. Using a cellophane adhesive tape, a peeling test was carried out (JIS A-6910).

12. Film strength

A dumbbell No. 2 sample was prepared from a 0.5 mm coated film dried for 5 days, and evaluated by an autograph (20° C., 60% RH).

The following examples illustrate the present invention in more detail without any intention of limiting the invention thereby. In the following description, all percentages and parts are by weight.

(1) Production of dissimilar polymers (S)
Dissimilar polymer S-1

Eighty parts of styrene, 17 parts of methyl methacrylate, 3 parts of t-dodecylmercaptan were put in a solution of 0.5 part of sodium laurylsulfate and 1.0 part of potassium persulfate in 200 parts of water. With stirring, the monomers were polymerized at 70° C. for 4 hours to give polymer particles. The resulting polymer particles had an average particle diameter of 0.2 micrometer and a number average molecular weight by GPC, calculated for polystyrene, of 6,000.

Dissimilar polymers S-2 to S-7

The monomers indicated in Table 1 were polymerized under the same conditions as in the production of S-1. As a result, dissimilar polymers S-2 to S-7 were obtained.

Dissimilar polymer S-8

Two parts, as solids, of the dissimilar polymer S-5 was added to a solution of 0.2 part of sodium laurylsulfate and 0.7 part of potassium persulfate in 200 parts of water. With stirring, the mixture was heated to 75° C., and 85 parts of styrene, 7 parts of methyl methacrylate, 8 parts of acrylic acid and 7 parts of t-dodecylmercaptan were continuously added and polymerized over 5 hours. After the addition, the temperature was raised to 85° C., and the reaction mixture was aged for 2 hours. The resulting polymer particles had an average particle diameter of 2 micrometers and a number average molecular weight by GSC, calculated for polystyrene, of 6,500.

TABLE 1

| Sample No. | Monomer compositions (parts) | Particle diameter (micrometer) | Number average molecular weight |
| --- | --- | --- | --- |
| S-1 | ST/MMA/MAA = 80/17/3 | 0.20 | 6,000 |
| S-2 | ST/MMA = 95/5 | 0.20 | 5,000 |
| S-3 | ST = 100 (polystyrene) | 0.25 | 20,000 |
| S-4 | ST/AA = 95/5 | 0.04 | 3,000 |
| S-6 | ST/MMA/AA = 85/7/8 | 0.55 | 6,000 |
| S-6 | ST/2-EHA/MAA = 80/18/2 | 0.40 | 5,500 |
| S-7 | ST/MMA/AA = 85/7/8 | 0.21 | 7,000 |
| S-8 | ST/MMA/AA = 85/7/8 | 2 | 6,500 |

In the abbreviations in Table 1 and the following tables have the following meanings.
DVB: divinybbenzene
EDMA: ethylene glycol dimethacrylate
ST: styrene
AN: acrylonitrile
BD: butadiene
AA: acrylic acid
MAA: methacrylic acid
TMPTMA: trimethylolpropane trimethacylate
EA: ethyl acrylate
BA: butyl acrylate
2-EHA: 2-ethylhexyl acrylate
MMA: methyl methacrylate
2-HEMA: 2-hydroxyethyl methacrylate
acrylic ester HH: a compound of the following formula

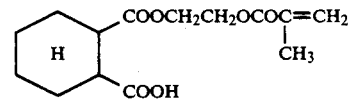

DBS: sodium dodecylbenzenesulfonate
POENPE: polyoxyethylene nonyl phenyl ether (2) Production of hollow pre-polymer particles (P)
Hollow pre-polymer particles P-1

Ten parts as solids of an aqueous dispersion of the dissimilar polymer S-1 used as seed polymer particles, 0.1 part of polyoxyethylene nonyl phenyl ether, 0.3 part of sodium laurylsulfate and 0.5 part of potassium persulfate and 390 parts of water were fed into a reaction vessel. A mixture of 75 parts of methyl methacrylate, 20 parts of divinylbenzene (calculated for pure divinylbenzene) and 5 parts of acrylic acid was added, and the entire mixture was stirred at 30° C. for 1 hour. Major amounts of the the above substances were absorbed by the seed polymer particles. The monomers were polymerized at 70° C. for 5 hours with stirring to give a dispersion of capsular particles containing water inside the particles in a polymerization yield of 99%. The dispersion was dried and observed under a transmission electron microscope. It was found that the resulting polymer particles are completely spherical hollow polymer particles with a previous central portion. The resulting hollow particles had an outside diameter of 0.40 micrometer and an inside diameter of 0.30 micrometer.

The resulting hollow-polymer particles P-1 were used in the production of the hollow polymer particles (Q) of the invention as seeds.

Hollow pre-polymer particles P-2 to P-6, P-8, P-9, P-11 and P-13

The same polymerization for production of P-1 was repeated except that the dissimilar polymers shown in Table 2 were used in the amounts indicated, 100 parts of a monomeric mixture of the monomer composition (m—1) indicated in Table 2 were used, and the amount of the emulsifier was adjusted. P-5 and P-6 were produced by performing the polymerization after 12 parts and 13 parts respectively of the dissimilar polymer S-2 were caused to be absorbed by 10 parts of toluene and 15 parts of dibutyl phthalate, respectively. The results of the polymerization are shown in Table 2.

Hollow pre-polymer particles P-7

Two parts as solids of an aqueous dispersion of the dissimilar polymer S-8, 5 parts of polyvinyl alcohol (Gosenol GH20, a product of Nihon Gosei Kagaku Co., Ltd.), 2 parts of 3,5,5-trimethylhexanoyl peroxide (Perroyl 355, a product of Nippon Oils and Fats Co., Ltd.) and 500 parts of water were charged into a reaction vessel. A mixture of 50 parts of 4-vinylpyridine, 2 parts of divinylbenzene, 28 parts of styrene, 20 parts of butyl acrylate and 100 parts of toluene was added, and the entire mixture was stirred at 40° C. for 2 hours to permit absorption of the monomers and the solvent in the seed polymer particles. Then, the monomers were polymerized at 70° C. for 15 hours with stirring. A dispersion of capsular particles containing toluene was obtained in a polymerization yield of 98%. The results of the polymerization are shown in Table 2.

Hollow pre-polymer particles P-10 and P-12

The same polymerization as in the production of P-7 was repeated except that the monomer composition and the amounts of the oily substance and toluene were changed as shown in Table 2. The results are shown in Table 2.

TABLE 2

| Sample No. | | P-1 | P-2 | P-3 | P-4 | P-5 | P-6 | P-7 | P-8 | P-9 |
|---|---|---|---|---|---|---|---|---|---|---|
| Dissimilar polymer | | S-1 | S-2 | S-2 | S-3 | S-2 | S-2 | S-8 | S-4 | S-7 |
| Amount (parts) of the dissimilar polymer | | 10 | 10 | 8 | 13 | 12 | 13 | 2 | 10 | 9 |
| Monomer composition (m-1) | | | | | | | | | | |
| (a1) | DVB (calculated for pure grade) | 11.6 | 11.6 | 23.2 | 23.2 | 17.4 | 17.4 | 1.2 | 11.6 | 11.6 |
| | EDMA | | | | | | | | | |
| (b-1) | ST | | | 5 | 5 | | | 28 | | |
| | Vinylpyridine | | | | | | | 50 | | |
| | Ethylvinylbenzene | 8.4 | 8.4 | 16.8 | 16.8 | 12.6 | 12.6 | 0.8 | 8.4 | 8.4 |
| (c-1) | AA | 5 | | 5 | 5 | | | | 5 | 5 |
| | MAA | | 5 | | | 5 | | | | |
| | EA | | | | | | | | | |
| | BA | | | | | | | 20 | | |
| | MMA | 75 | 75 | 50 | 50 | 65 | 65 | | 75 | 75 |
| | Acrylic ester HH | | | | | | | | | |
| Oily substance | | — | — | — | Toluene | Dibutyl phthalate | Toluene | — | — | |
| Amount of the oily substance | | — | — | — | 10 | 15 | 100 | — | — | |
| State of the partices after polymerization | | Hydrous capsular particles | ← | ← | ← | Oil-containing capsular particles | ← | ← | Hydrous capsular particles | ← |
| Inside diameter/outside diameter (μm) ratio of the dried particles | | 0.30/0.40 | ← | ← | ← | ← | — | 9/13 | 0.05/0.08 | 0.30/0.40 |

| | | P-10 | P-11 | P-12 | P-13 | P'-1 | P'-2 |
|---|---|---|---|---|---|---|---|
| Dissimilar polymer | | S-7 | S-6 | S-8 | S-5 | | |
| Amount (parts) of the dissimilar polymer | | 5 | 20 | 2 | 50 | — | |
| Monomer composition (m-1) | | | | | | | |
| (a1) | DVB (calculated for pure grade) | | 26.1 | 5.8 | 11.6 | | |
| | EDMA | 25 | | | | | |
| (b1) | ST | | | | | 42 | 79 |
| | Vinylpyridine | | | 40 | | | |
| | Ethylvinylbenzene | | 18.9 | 4.2 | 84 | | |
| (c1) | AA | | | | 5 | 3 | 1 |
| | MAA | | 5 | | | 10 | |
| | EA | | | | | 20 | |
| | BA | | | 50 | | 45 | |
| | MMA | 70 | 53 | | 75 | | |
| | Acrylic ester HH | | 2 | | | | |
| Oily substance | | Toluene | — | Toluene | — | | |
| Amount of the oily substance | | 400 | — | 130 | — | | |
| State of the partices after polymerization | | Oil-containing capsular particles | Water-containing capsular particles | Oil-containing capsular particles | Hydrous capsular particles | | |
| Inside diameter/outside diameter (μm) ratio of the dried particles | | 0.80/0.90 | 0.25/0.60 | 6/18 | 0.08/0.70 | 0/0.40 | 0/4 |

(3) Production of hollow polymer particles (Q)

Q-1

Twenty parts as solids of the aqueous hollow particle dispersion P-1 prepared by the method described hereinabove, 127 parts of water and 0.7 part of potassium persulfate were put in a 2-liter reaction vessel, and the temperature was elevated to 85° C. in an atmosphere of nitrogen. Then, a monomer emulsion of the following formulation was continuously added dropwise over 3 hours.

| Formulation of the monomer emulsion | |
|---|---|
| Water | 40 parts |
| Butyl acrylate | 5 parts |
| Methyl methacrylate | 89 parts |
| Methacrylic acid | 5 parts |
| N-methylol methacrylamide | 1 part |
| Sodium dodecylbenzenesulfonate | 0.3 part |

After the addition, the reaction mixture was maintained at the above temperature for 2 hours, and then cooled. The resulting dispersion had no coagulated matter. The particle diameter of the dispersion was measured by a particle size analyzer (Model N-4 made by Coulter Co.) and found to be 0.63 micrometer. The resulting dispersion was dried and observed under a transmission-type electron microscope. It was found that the polymer layer was coated on the surface of the hollow pre-polymer particles. The resulting hollow particles had an outside diameter of 0.63 micrometer and an inside diameter of 0.30 micrometer. There was no formation of fresh particles, and all particles had spaces inside. The production conditions and the results are shown in Table 3.

Q-2, Q-3, Q-6 and R-1 to R-5

The same polymerization as in the production of Q-1 was repeated except that some of the conditions were changed as indicated in Table 3. R-1 to R-5 are outside the scope of the invention.

Q-4

A 100-liter stainless steel pressure reactor was charged with 150 parts of water, 1.0 part of potassium persulfate, 0.4 part of sodium hydrogen sulfite, 0.5 part of sodium dodecylbenzenesulfonate, 0.1 part of polyoxyethylene nonyl phenyl ether (EO=30 moles) and 40 parts as solids of P-3 as seed particles. With stirring, the temperature was raised to 70 ° C., and a monomeric mixture of the following composition was continuously added dropwise over 12 hours.

| Monomeric mixture | |
|---|---|
| Styrene | 75 parts |
| 1,3-Butadiene | 15 parts |
| Methacrylic acid | 5 part |
| Acrylic ester HH | 5 parts |

After the addition, the reaction mixture was aged at 80 ° C. for 5 hours, and then cooled. The resulting dispersion contained no coagulated matter. The dispersion had a particle diameter of 0.55 micrometer. After drying, the polymer particles were hollow particles having an outside diameter of 0.54 micrometer and an inside diameter of 0.30 micrometer. There was no formation of new particles.

Q-5, Q-7 and Q-8

The same polymerization as in the production of Q-4 was carried out except that some of the conditions were changed as indicated in Table 3.

Q-9

A 2-liter reaction vessel was charged with 500 parts as solids of the aqueous hollow particle dispersion P-9 as seed particles, 1400 parts of water, 0.7 part of sodium dodecylbenzenesulfonate and 0.1 part of polyoxyethylene nonyl phenyl ether (EO=30 moles), and a mixture composed of 5 parts of n-butyl acrylate, 89 parts of methyl methacrylate and 6 parts of methacrylic acid was added. The entire mixture was stirred at 40 ° C. for 1 hour to permit almost complete absorption of the monomeric mixture in the seed hollow polymer particles. Then, 1.0 part of benzoyl peroxide and 0.5 part of sodium hydrogen sulfite were added. The temperature was elevated to 70 ° C., and the monomeric mixture was polymerized for 5 hours, followed by cooling. The resulting dispersion contained no coagulated matter. After drying, the polymer particles were hollow particles having an outside diameter of 0.41 micrometer and an inside diameter of 0.30 micrometer. There was no formation of new particles.

R-6

The same procedure as in the production of Q-1 was repeated except that ordinary polymer particle dispersions shown below were used instead of the dispersion of P-1. The resulting polymer particles (R-6) had a particle diameter of 0.64 micrometers and contained no inside void.

Polymer particle dispersion P'-1 as seeds:

An aqueous dispersion produced by ordinary emulsion polymerization (particle diameter 0.40 micrometer; pH 7.2; solids content 40%; monomer composition butyl acrylate/methyl methacrylate/styrene/acrylic acid=45/10/42/3). The polymer particles had no inside void.

R-7

The same procedure as in the production of R-6 was repeated except that the following seed polymer particles were used in the amount indicated in Table 3.

Polymer particle dispersion P'-2 as seeds:

Aqueous dispersion produced by ordinary suspension polymerization (particle diameter 4 micrometers; pH 7.8; solids content 45%; the monomer composition ethyl acrylate/styrene/acrylic acid=20/79/1). The polymer particles contained no inside void.

Commercial fine polymer particles (OP-84 produced by Rohm & Haas Co.) were designated as P'-3, and Plastic Pigment AK8801 produced by Asahi Chemical Industry Co., Ltd., as P'-4.

R-8

A 2-liter reaction vessel was charged with 200 parts as solids of the aqueous hollow particle dispersion P'-3 as seed particles, 460 parts of water and 0.5 part of potassium persulfate, and the temperature was elevated to 85° C. in an atmosphere of nitrogen. A monomer emulsion of the following formulation was added dropwise, and polymerized over 3 hours.

| Formulation of the monomer emulsion | |
|---|---|
| Water | 40 parts |
| Styrene | 95 parts |
| Methyl methacrylate | 5 parts |
| Sodium dodecylbenzenesulfonate | 0.3 part |
| Polyoxyethylene nonyl phenyl ether | 0.1 part |

After the addition, the reaction mixture was maintained at the above temperature for 2 hours and cooled. After drying, the polymer particles were hollow particles having an outside diameter of 0.62 micrometer and an inside diameter of 0.30 micrometer. There was no formation of new particles.

The percentages of the recurring units (a), (b), (c) and (d) defined in the claims were calculated from the monomeric composition of the dissimilar polymers (S), the monomeric composition (m−1) of the hollow prepolymer particles (P) and the monomeric composition (m−2) of the hollow polymer particles (Q) and the amounts of the hollow pre-polymer particles (P) and the dissimilar polymer (S) used per 100 parts of (m−2).

The properties of the polymer particles are shown in Table 4.

TABLE 3

| Polymer No. | Q-1 | Q-2 | Q-3 | Q-4 | Q-5 | Q-6 | Q-7 | Q-8 | Q-9 | R-1 | R-2 | R-3 | R-4 | R-5 | R-6 | R-7 | R-8 |
|---|---|---|---|---|---|---|---|---|---|---|---|---|---|---|---|---|---|
| Hollow pre-polymer particles | P-1 | P-11 | P-2 | P-3 | P-4 | P-10 | P-5 | P-6 | P-7 | P-13 | P-7 | P-8 | P-10 | P-12 | P'-1 | P'-2 | P'-3 |
| Amount of the hollow prepolymer particles (parts) | 20 | 40 | 40 | 40 | 60 | 60 | 60 | 60 | 500 | 50 | 60 | 60 | 2500 | 40 | 20 | 200 | 200 |
| Monomer composition (m-2) | | | | | | | | | | | | | | | | | |
| (b1) AN | | | | | 20 | | | | | 10 | | | | | | | |
| ST | | 96 | 60 | 75 | 55 | | | | | | 55 | 55 | | 80 | | | 95 |
| Vinylpyridine | | | | | | | | | | | | | | | | | |
| Acrylamide | | | | | | | | | | | | | | | | | |
| N-methylolacrylamide | 1 | | | 1 | | | | | | | | | | | | 1 | 1 |
| Vinyl chloride | | | | | | | 57 | | | | | | | | | | |
| Vinylidene fluoride | | | | | | | | 10 | | | | | | | | | |
| Vinyl acetate | | | | | | 25 | | | | | | | | | | | |
| (c1) AA | | | 5 | | | | | 10 | | 10 | | 8 | 4 | 3 | | 5 | |
| MAA | 5 | 3 | 30 | 5 | 3 | 20 | | | 6 | | 5 | | 4 | 2 | 5 | | |
| EA | | | | | | | | | | 5 | | | 12 | | | 5 | |
| BA | 5 | | 5 | | | 5 | | 30 | 5 | 10 | | | | | 5 | | |
| 2EHA | | | | | | | | | | | | | | 15 | | | |
| MMA | 89 | | | | 7 | 50 | | 50 | 89 | | 40 | 90 | | 80 | 89 | 89 | 5 |
| 2HEMA | | | | | | | 3 | | | 10 | | 2 | | | | | |
| Acrylic ester HH | | 1 | | 5 | | | 40 | | | | | | | | | | |
| (d1) BD | | | | 15 | 15 | | | | | | | | | | | | |
| (emulsifier) DBS | 0.3 | 0.7 | 0.4 | 0.5 | — | 1.5 | 0.3 | 0.3 | 0.7 | 06 | 0.5 | 0.5 | 4.5 | 1.0 | 0.3 | 0.3 | 0.3 |
| POENPE | — | 0.5 | 0.1 | 0.1 | 0.5 | 0.3 | 0.1 | 0.1 | 0.1 | — | 0.1 | 0.1 | 2.0 | 0.5 | 0.2 | 0.2 | 0.1 |
| pH at the time of the emulsion polymerization | 2.3 | 2.5 | 2.4 | 2.2 | 2.3 | 2.4 | 2.0 | 2.0 | 1.9 | 2.3 | 2.1 | 2.2 | 2.4 | 2.5 | 3.4 | 4.2 | 7.8 |
| Polmerization stability | ○ | ○ | ○ | ○ | ○ | ○ | ○ | ○ | ○ | ○ | Δ | Δ | ○ | Δ-X | ○-Δ | Δ | Δ |
| Occurrence of new particles | No | No | No | No | No | No | No | No | No | No | Yes (slight) | Yes | | | | | |
| Recurring units of particles (Q) (a), (b), (c) and (d) | | | | | | | | | | | | | | | | | |
| Component (a) % | 1.8 | 6.2 | 3.0 | 6.1 | 7.7 | 8.9 | 5.8 | 5.8 | 8.9 | 2.6 | 0.4 | 4.0 | 22.9 | 1.6 | — | — | |
| Component (b) % | 3.3 | 76.9 | 47.5 | 61.4 | 58.4 | 17.2 | 43.7 | 14.5 | 12.3 | 54.6 | 64.0 | 6.1 | 7.0 | 12.9 | 7.8 | 53.0 | |
| Component (c) % | 94.9 | 16.9 | 49.5 | 21.8 | 24.5 | 73.9 | 50.5 | 79.7 | 78.8 | 42.8 | 35.6 | 89.9 | 70.1 | 85.5 | 92.2 | 47.0 | |
| Component (b) % | — | — | — | 10.7 | 9.4 | — | — | | | | | | | | — | — | |

TABLE 4

| Hollow polymer particles of the invention | | Q-1 | Q-2 | Q-3 | Q-4 | Q-5 | Q-6 | Q-7 | Q-8 | Q-9 | R-1 | R-2 | R-3 | R-4 |
|---|---|---|---|---|---|---|---|---|---|---|---|---|---|---|
| Calculated Tg of the surface coat layer (°C.) | | 97 | 105 | 110 | 48 | 52 | 87 | 42 | 90 | 90 | 70 | 105 | 105 | 83 |
| Properties of the particles | MFT (°C.) | >80 | >80 | >80 | 55 | 59 | >80 | 45 | >80 | >80 | >80 | >80 | >80 | >80 |
| | Particle diameter (micrometers) (**1) | 0.63 | 0.90 | 0.59 | 0.55 | 0.50 | 1.02 | 0.58 | 0.52 | 0.41 | 1.1 | 22 | 0.09 | 0.91 |
| | Inside diameter after drying (micrometers) (**2) | 0.30 | 0.25 | 0.30 | 0.30 | 0.30 | 0.81 | 0.30 | 0.30 | 0.30 | 0.08 | 9 | 0.05 | 0.81 |
| | Outside diameter (micrometers) (**2) | 0.63 | 0.90 | 0.54 | 0.54 | 0.50 | 1.02 | 0.50 | 0.50 | 0.41 | 1.0 | 22 | 0.09 | 0.91 |
| | Inside diameter/outside diameter | 0.48 | 0.28 | 0.56 | 0.56 | 0.60 | 0.79 | 0.60 | 0.60 | 0.73 | 0.08 | 0.41 | 0.56 | 0.89 |
| | Proportion of a toluene-insoluble portion (%) | 26 | 30 | 42 | 38 | 23 | 35 | 30 | 25 | 76 | 27 | 34 | 31 | 97 |
| | MFR | 0.73 | 0.31 | 0.26 | 0.43 | 0.25 | 0.28 | 0.64 | 0.31 | 0.12 | 0.56 | 0.38 | 0.33 | 0.004 |

| Hollow polymer particles of the invention | | R-5 | R-6 | R-7 | R-8 | P'-1 | P'-3 | P'-4 |
|---|---|---|---|---|---|---|---|---|
| Calculated Tg of the surface coat layer (°C.) | | 65 | 97 | 97 | 100 | — | — | — |
| Properties of the particles | MFT (°C.) | >80 | >80 | >80 | >80 | >80 | >80 | >80 |
| | Particle diameter (micrometers) (**1) | 27 | 0.64 | 4.7 | 0.62 | 0.40 | 0.55 | 0.51 |
| | Inside diameter after drying (micrometers) | 6 | 0 | 0 | 0.30 | 0.30 | 0.30 | 0 |

TABLE 4-continued

| (**2) | | | | | | | |
|---|---|---|---|---|---|---|---|
| Outside diameter (micrometers) (**2) | 27 | 0.64 | 4.7 | 0.62 | 0.40 | 0.55 | 0.51 |
| Inside diameter/ outside diameter | 0.22 | 0 | 0 | 0.48 | 0.75 | 0.55 | 0 |
| Proportion of a toluene-insoluble portion (%) | 30 | 23 | 26 | 6.8 | 99.5 | 3.5 | 14 |
| MFR | 0.74 | 0.87 | 0.98 | 1.7 | 0 | 1.5 | 1.3 |

(**1): Measured by using a particle size analyzer.
(**2): Measured by using a transmission-type electron microscope.

EXAMPLES 1-9 AND COMPARATIVE EXAMPLES 1-13

Coating compositions (solids content 62%) having the compositions shown in Table 5 were prepared by using various pigments.

In Examples 1 to 9, Q-1 to Q-9, which are the hollow polymer particles (Q) of the invention, were used respectively as the white pigments. In Comparative Examples 1 to 5, R-1 to R-5 and R-8, which are hollow polymer particles outside the scope of the invention, were used respectively as the white pigments. In Comparative Example 7, P'-3, which is commercial hollow polymer particles, was used as the white pigment. In Comparative Examples R-6, R-7 and P'-4, which are nonhollow polymer particles, were used as the white pigment. In Comparative Example 12, anatase-type titanium dioxide (A220, a product of Ishihara Sangyo Co., Ltd.) which is an inorganic white pigment was used. In Comparative Example 13, no white pigment was used, and instead 100 parts of clay was used.

TABLE 5

| Component | Amount (parts) |
|---|---|
| Clay (UW-90, a product of Mineral Chemical Phillips Co.) | 90 (*1) |
| White pigment | 10 (*1) |
| Polyacrylic acid-type dispersant (Aron T-40, a product of Toa Synthetic Chemical Industry Co., Ltd.) | 0.12 |
| Dispersing agent (sodium hexametaphosphate) | 0.03 |
| Carboxy-modified styrene/butadiene latex (#0804, a product of Japan Synthetic Rubber Co., Ltd.) | 13 |
| NH4OH | 0.1 |

(*1): In Comparative Example 13, no white pigment was used, but 100 parts of the clay was used.

In each run, each of the coating compositions obtained in Examples 1 to 9 and Comparative Examples 1 to was coated on one surface of medium-quality base paper. The coated paper was put in a hot air dryer, and at 150° C. for 30 seconds. Then it was super-calendered ice twice and left to stand in a constant-temperature chamber (20° C., 65% RH).

The properties of the coated papers obtained are shown in Table 6. These properties were measured by the following methods.

(1) Dry pick

An RI printing press was used, and using ink (tack No. 8), printing was performed several times overlappingly. The state of picking on the picking surface was observed with unaided eyes a 5-point method. Larger numbers indicate better results.

(2) Wet pick

Printing was performed on an RI printing press using a molten roll while applying dampening water. The state of picking on the printed surface was observed with unaided eyes, and rated by a 5-point method. Larger numbers indicate better results.

(3) Gloss before printing

Measured by using a Murakami-type glossmeter (75°-75°) Larger numbers show better results.

(4) Gloss after printing

Solid printing was performed by an RI printing press using a web offset ink, and the gloss of the printed paper was measured by using a Murakami-type glossmeter (75°-75°)

(5) Whiteness

Measured by a Hunter calorimetric photometer fitted with a blue filter.

(6) Opacity

Measured by a Hunter calorimetric photometer fitted with a green filter.

(7) Adaptability to gravure printing

By using a gravure printing adaptability tester (of the type used by Printing Department of Ministry Finance, Japan), the state of occurrence of speckles on the printed paper was observed with unaided eyes and rated on the following scale.

◎ : excellent
○ : good
Δ: fair
X: poor

TABLE 6

| | Dry pick | Wet pick | Gloss before printing | Gloss after printing | Whiteness | Opacity | Gravure printing adaptability |
|---|---|---|---|---|---|---|---|
| Example | | | | | | | |
| 1 | 4.1 | 4.2 | 83.0 | 86.3 | 84.2 | 86.1 | ◎ |
| 2 | 4.2 | 4.2 | 83.3 | 86.5 | 84.2 | 85.9 | ○ |
| 3 | 4.3 | 4.2 | 83.5 | 86.7 | 84.5 | 86.5 | ◎ |
| 4 | 4.9 | 4.7 | 83.1 | 86.2 | 83.9 | 86.0 | ◎ |
| 5 | 4.9 | 4.6 | 83.4 | 86.5 | 84.1 | 86.2 | ○ |
| 6 | 4.6 | 4.1 | 80.8 | 83.2 | 84.6 | 86.4 | ○ |
| 7 | 4.5 | 4.4 | 82.9 | 85.8 | 84.3 | 85.7 | ○ |
| 8 | 4.1 | 4.6 | 83.3 | 85.7 | 84.0 | 85.8 | ○ |
| 9 | 4.0 | 4.0 | 83.4 | 86.5 | 84.5 | 86.3 | ◎ |

TABLE 6-continued

| | Dry pick | Wet pick | Gloss before printing | Gloss after printing | Whiteness | Opacity | Gravure printing adaptability |
|---|---|---|---|---|---|---|---|
| Comparative Example | | | | | | | |
| 1 | 3.7 | 2.9 | 78.6 | 82.3 | 82.9 | 83.6 | Δ |
| 2 | 3.1 | 1.3 | 76.9 | 82.3 | 83.3 | 85.4 | X |
| 3 | 4.0 | 3.5 | 79.3 | 83.4 | 82.9 | 84.0 | X |
| 4 | 2.8 | 2.4 | 77.4 | 82.6 | 84.4 | 86.5 | X |
| 5 | 3.4 | 2.0 | 75.8 | 82.1 | 82.2 | 83.3 | X |
| 6 | 2.8 | 2.9 | 80.3 | 83.7 | 83.5 | 85.3 | X |
| 7 | 2.9 | 2.8 | 80.5 | 83.9 | 83.7 | 85.4 | X |
| 8 | 3.3 | 2.7 | 81.2 | 84.4 | 83.0 | 84.1 | X |
| 9 | 2.1 | 1.5 | 71.1 | 78.5 | 82.8 | 84.0 | X |
| 10 | 3.6 | 2.9 | 81.7 | 84.3 | 82.9 | 83.9 | Δ |
| 11 | 2.7 | 2.3 | 72.3 | 79.8 | 84.3 | 86.4 | Δ |
| 12 | 4.2 | 4.3 | 70.8 | 77.2 | 84.5 | 86.6 | X |
| 13 | 4.2 | 4.2 | 69.8 | 77.2 | 82.7 | 84.0 | Δ |

EXAMPLES 10-15 AND COMPARATIVE EXAMPLES 14-18

Coating compositions (solids content 64%) for offset printing having the compositions shown in Table 7 were obtained.

was then supercalendered twice at 50° C. under 100 kg/cm², and left to stand in a constant-temperature chamber (20° C., 65% RH).

The properties of the resulting coated papers were measured as above, and are shown in Table 8. The trapping property of the coated papers was measured

TABLE 7

| | Example | | | | | | Comparative Example | | | | |
|---|---|---|---|---|---|---|---|---|---|---|---|
| | 10 | 11 | 12 | 13 | 14 | 15 | 14 | 15 | 16 | 17 | 18 |
| Clay (UW-90) | 65 | 60 | 55 | 60 | 60 | 60 | 69.5 | 10 | 60 | 60 | |
| Heavy calcium (Carbital 90, a product of Fuji Kaolin Industry Co., Ltd.) | 30 | 30 | 30 | 30 | 30 | 30 | 30 | 30 | 30 | 30 | |
| Q-3 | 5 | 10 | 15 | | 5 | 5 | 0.5 | 60 | | | |
| Q-4 | | | | 10 | | | | | | | |
| Commercial polystyrene latex (L-8801, a product of Asahi Chemical Industry Co., Ltd.) | | | | | 5 | | | | 10 | | |
| Titanium dioxide (A-220, a product of Ishihara Sangyo Co., Ltd.) | | | | | | 5 | | | | 10 | |
| Commercial hollow polymer latex (OP-84, a product of Rohm & Haas Co.) | | | | | | | | | | | 10 |
| Dispersed type (Aron T-40, a product of Toa Synthetic Chemical Industry Co., Ltd.) | | | | | | | 0.2 | | | | |
| Oxidized starch (Oji Ace B, a product of Oji Corn Starch Co., Ltd.) | | | | | | | 5 | | | | |
| Binder latex (*) | | | | | | | 12 | | | | |

(*): Pigment binder, a carboxy-modified styrene/butadiene copolymer latex (#0619, a product of Japan Synthetic Rubber Co., Ltd.)

COMPARATIVE EXAMPLES 19-20

Coating compositions were prepared in the same manner as in Example 11 except that the amount (12 parts) of the pigment binder was changed to 2 parts and 40 parts respectively.

The coating compositions were each coated on one surface of high-quality base paper, and immediately then, dried at 150° C. for 30 seconds. The coated paper by the following method, and is also shown in Table 8.

(7) Trapping property

An RI printing press made by Akira Seisakusho was used, and the printed surface was observed with unaided yes, and rated on the following scale.

◎ : excellent
○ : good
Δ: fair
X: poor

TABLE 8

| Run | Dry pick | Wet pick | Gloss before printing | Gloss after printing | Whiteness | Opacity | Gravure printing adaptability |
|---|---|---|---|---|---|---|---|
| Example | | | | | | | |
| 10 | 4.5 | 4.4 | 80.3 | 83.2 | 85.4 | 90.9 | ○ |
| 11 | 4.6 | 4.4 | 80.5 | 83.5 | 85.6 | 91.0 | ◎ |
| 12 | 4.7 | 4.5 | 81.1 | 83.9 | 85.8 | 91.2 | ○ |
| 13 | 4.9 | 4.6 | 80.3 | 83.3 | 85.5 | 91.0 | ◎ |
| 14 | 4.4 | 4.3 | 80.4 | 83.3 | 85.2 | 90.5 | ○ |
| 15 | 4.6 | 4.5 | 80.3 | 83.4 | 85.9 | 91.3 | ○ |
| Comparative Example | | | | | | | |

TABLE 8-continued

| Run | Dry pick | Wet pick | Gloss before printing | Gloss after printing | Whiteness | Opacity | Gravure printing adaptability |
|---|---|---|---|---|---|---|---|
| 14 | 4.5 | 4.3 | 68.4 | 73.5 | 83.8 | 88.0 | Δ |
| 15 | 3.3 | 2.9 | 72.3 | 76.2 | 85.0 | 90.0 | X |
| 16 | 3.5 | 2.9 | 79.5 | 82.0 | 83.9 | 88.2 | Δ |
| 17 | 4.2 | 4.1 | 68.6 | 73.7 | 85.9 | 91.3 | X |
| 18 | 3.0 | 2.9 | 77.3 | 80.2 | 85.0 | 90.6 | X |
| 19 | 2.1 | 1.3 | 74.0 | 76.5 | 85.1 | 90.6 | X |
| 20 | Flowability was poor, and a uniform coated paper could not be prepared. | | | | | | |

The following conclusions can be drawn from the above test results.

In Comparative Example 1, the inside diameter/outside diameter ratio of the hollow polymer particles was less than 0.2. The whiteness and opacity were much deteriorated.

In Comparative Examples 2 and 5, the particle diameters of the hollow polymer particles exceeded 20 micrometers. The polymerization stability was poor and new particles occurred. The gloss and strength (dry pick were inferior.

In Comparative Example 3, the particle diameter was less than 0.15 micrometer. The polymerization stability was poor, and the formation of new particles was observed. The opacity, whiteness and gloss were very inferior.

In Comparative Example 4, the proportion of the toluene-insoluble portion exceeded 90%, the MFR was lower than 0.1, and the inside diameter/outside diameter ratio exceeded 0.8. The gloss and strength of the coated papers were very inferior.

In Comparative Example 11, the hollow polymer particles were used as a white pigment, but their surface was not modified with another desirable polymer layer. The whiteness and opacity were satisfactory, but the coated paper strength (dry pick and wet pick), gloss and printing adaptability were inferior.

In Comparative Examples 8 to 10 and 16, nonhollow polymer particles were used as the white pigment. The coated paper had gloss to some extent, but its strength, whiteness, opacity and printing adaptability were inferior.

In Comparative Examples 12 and 17, titanium dioxide was used as the white pigment. The whiteness and opacity were excellent, but the coated paper strength, gloss and printing adaptability were inferior.

In Comparative Example 13, no white pigment was used. The strength of the coated paper was satisfactory, but the gloss, whiteness, opacity and printing adaptability were inferior.

In Comparative Example 14, the hollow polymer particles were used in an amount of less than 1 part by weight. The strength of the coated paper was satisfactory, but the gloss, whiteness, opacity and printing adaptability were inferior.

In Comparative Example 15, the amount of the hollow polymer particles as the white pigment exceeded 50 parts by weight. The whiteness and opacity were excellent, but the coated paper strength, gloss and printing adaptability were inferior.

In Comparative Example 9, the amount of the pigment binder was less than 3 parts by weight per 100 parts by weight of the pigments. The whiteness and opacity are satisfactory, but the coated paper strength, gloss and printing adaptability were inferior.

In Comparative Example 20, the amount of the pigment binder exceeded 30 parts by weight per 100 parts by weight of the pigments. Since the viscosity of the coating composition was high, it was difficult to coat uniformly on paper, and coated paper could not be prepared.

The hollow polymer particles in Comparative Examples 6, 7 and 18 were produced by the alkali swelling method (IV) of the prior art discussed hereinabove. It is difficult to design and modify the surface of the particles so that its bindability with the pigment or the pigment binder and the dispersion stability at the time of blending is improved. Furthermore, since the Tg of the polymer layer (styrene/acrylic resin) for maintaining voids inside is low, the polymer particles have the defect of possessing low resistance to heating and pressurizing treatments such as calendering. Hence, papers coated with these particles have inferior strength (dry pick, wet pick), gravure printing adaptability and trapping property although they have gloss, whiteness and opacity to some extent.

EXAMPLE 16

A water-base coating composition having the formulation shown in Table 9 was prepared by using the solid hollow polymer particles Q-1 as a white pigment.

TABLE 9

| Ingredient | Amount (parts by weight) |
|---|---|
| Q-1 (white pigment) | 25.6 (solids) |
| Film-forming styrene/acrylic resin emulsion (*1) | 136.6 (solids) |
| Naphthalenesulfonic acid/formaldehyde condensate-type dispersing agent (Demol EP, Kao-Atlas) | 3.9 |
| Polyethylene glycol nonyl phenyl ether (wetting agent) | 1.1 |
| Polyether-type thickener (SN Thickener 601, San Nopco) | 4.5 |
| 2,2,4-trimethyl-1,3-pentadiol monoisobutyrate | 22.1 |
| silica/silicone-type defoamer | 0.9 |
| Ethylene glycol (freeze stabilizer) | 22.7 |
| Aqueous ammonia (25%) (pH adjuster) | 0.5 |
| Water (*2) | moderate |
| (NV)v % (*3) | 41 |

TABLE 9-continued

| Ingredient | Amount (parts by weight) |
|---|---|
| PVC % (*4) | 20 |

(*1): AE316 (a product of Japan Synthetic Rubber Co., Ltd.; toluene-insoluble portion 50%, Tg 5° C., MFT 15° C.)
(*2): Such an amount that the concentration of components other than water became 55% by weight based on the entire composition.
(*3): (NV)v % ... nonvolatile component volume fraction defined by the following equation.

$$(NV)v = \frac{\text{Volume of the white pigment} + \text{Volume of the film-forming resin (dry)}}{\text{Total volume of the coating composition (wet)}} \times 100$$

(*4): PVC % ... pigment volume concentration.

$$PVC = \frac{\text{Volume of the white pigment (dry)}}{\text{Volume of the white pigment} + \text{Volume of the film-forming resin (dry)}} \times 100$$

EXAMPLES 17-22

Coating compositions having a (NV)v of 41% and a PVC of 20% were prepared as in Example 16 except that Q-2, Q-3, Q-6, Q-7, Q-8 and Q-9 were used respectively instead of the white pigment in Table 9.

COMPARATIVE EXAMPLE 21

A coating composition having a (NV)v of 41% and a PVC of 20% was prepared in the same way as in Example 16 except that the hollow pre-polymer particles P-1 were used as the white pigment in an amount of 23.4 parts (solids), and the amount of water was adjusted.

COMPARATIVE EXAMPLES 22-23

Coating compositions having a (NV)v of 41% and a PVC of 20% were prepared in the same way as in Example 16 except that the polymer particles R-6 and commercial polystyrene latex L-8801 (Asahi Chemical) were used respectively as the white pigment in an amount of 32 parts (solids), and the amount of water added was adjusted

COMPARATIVE EXAMPLE 24

A coating composition having a (NV)v of 41% and a pVC of 20% was prepared in the same way as in Example 16 except that 124.7 parts (solids) of titanium dioxide (R-930, a product of Ishihara Sangyo Co., Ltd.) was used instead of the white pigment in Table 9, and the amount of water added was adjusted.

COMPARATIVE EXAMPLES 25-29

Coating compositions having a (NV)v of 41% and a PVC of 20% were prepared in the same way as in Example 16 except that the polymer particles R-1, R-2, R-3, R-4 and R-8 were used respectively instead of the white pigment in Table 9.

The coating compositions obtained in Examples 16 to 22 and Comparative Examples 21 to 29 were coated respectively on paper substrates to a predetermined film thickness and dried. The physical and chemical properties of the coated films are shown in Table 10.

TABLE 10

| | Example | | | | | | |
|---|---|---|---|---|---|---|---|
| | 16 | 17 | 18 | 19 | 20 | 21 | 22 |
| White pigment | Q-1 | Q-2 | Q-3 | Q-6 | Q-7 | Q-8 | Q-9 |
| Average particle diameter of the white pigment polymer particles (μm) | 0.63 | 0.90 | 0.59 | 1.02 | 0.58 | 0.52 | 0.41 |
| Average inside void diameter of the white pigment polymer particles (μm) | 0.30 | 0.25 | 0.30 | 0.81 | 0.30 | 0.30 | 0.30 |
| (NV)v % | | | | 41 | | | |
| PVC % | | | | 20 | | | |
| Properties of the coated film | | | | | | | |
| 60° Specular gloss (glass plate) (*3) | 90 | 90 | 91 | 90 | 91 | 91 | 91 |
| 45°/0° Gloss (hiding ratio testing paper) (*4) | 87 | 87 | 88 | 87 | 88 | 88 | 88 |
| Light transmittance (*5) | 3.3 | 3.7 | 3.1 | 3.0 | 3.1 | 3.2 | 3.1 |
| Hiding ratio (*6) | 0.89 | 0.88 | 0.90 | 0.91 | 0.90 | 0.90 | 0.90 |
| Water resistance (*7) | ○ | ○ | ○ | ○ | ○ | ○ | ○ |
| Gloss retention (%) after the water resistance test (*8) | 91 | 93 | 89 | 87 | 96 | 98 | 92 |
| Light transmittance (%) after the water resistance test (*9) | 92 | 92 | 90 | 89 | 93 | 96 | 90 |
| Alkali resistance (*10) | ○ | ○ | ○-Δ | ○-Δ | ○ | ○ | ○ |
| Gloss retention (%) after the alkali resistance test (*11) | 92 | 91 | 87 | 83 | 92 | 96 | 89 |
| Light transmittance (%) after the alkali resistance test (*12) | 93 | 94 | 89 | 86 | 93 | 97 | 91 |
| Thermal resistance (*13) | ○ | ○ | ○ | ○ | ○ | ○ | |
| Hiding ratio (%) after the thermal resistance test (*14) | 95 | 96 | 92 | 93 | 96 | 98 | 98 |
| Washing resistance (*15) | ○ | ○ | ○ | ○ | ○ | ○ | ○ |
| Impact resistance (*16) | ○ | ○ | ○ | ○ | ○ | ○ | ○ |
| Weatherability (*17) | ○ | ○ | ○ | ○ | ○ | ○ | ○ |
| Accelerated weatherability (*18) | ○ | ○ | ○ | ○ | ○ | ○ | ○ |
| Solvent resistance (*19) | ○ | ○ | ○ | ○-Δ | ○ | ○ | ○ |
| Adhesion (*20) | ○ | ○ | ○ | ○ | ○ | ○ | ○ |
| Film strength (kg/cm²) (*21) | 29 | 25 | 30 | 19 | 24 | 28 | 23 |

| | Comparative Example | | | | | | | |
|---|---|---|---|---|---|---|---|---|
| | 21 | 22 | 23 | 24 | 25 | 26 | 27 | 28 | 29 |
| White pigment | P-1 | R-6 | L-8801 | TiO₂ R-930 | R-1 | R-2 | R-3 | R-4 | R-8 |

TABLE 10-continued

| | | | | | | | | | |
|---|---|---|---|---|---|---|---|---|---|
| Average particle diameter of the white pigment polymer particles (μm) | 0.40 | 0.64 | 0.35 | — | 1.1 | 22 | 0.09 | 0.91 | 0.62 |
| Average inside void diameter of the white pigment polymer particles (μm) | 0.30 | — | — | — | 0.08 | 9 | 0.05 | 0.81 | 0.30 |
| (NV)v % | | | | | 41 | | | | |
| PVC % | | | | | 20 | | | | |
| Properties of the coated film | | | | | | | | | |
| 60° Specular gloss (glass plate) (*3) | 86 | 87 | 91 | 88 | 86 | 79 | 89 | 87 | 90 |
| 45°/0° Gloss (hiding ratio testing paper) (*4) | 84 | 84 | 88 | 84 | 83 | 77 | 87 | 83 | 87 |
| Light transmittance (*5) | 3.0 | 60 | 70 | 2.6 | 42 | 5.4 | 6.3 | 3.9 | 3.3 |
| Hiding ratio (*6) | 0.91 | 0.56 | 0.71 | 0.92 | 0.68 | 0.83 | 0.80 | 0.85 | 0.86 |
| Water resistance (*7) | Δ | Δ | ○ | ○ | ○ | X | X | Δ | Δ |
| Gloss retention (%) after the water resistance test (*8) | 75 | 88 | 90 | 90 | 83 | 90 | 86 | 77 | 69 |
| Light transmittance (%) after the water resistance test (*9) | 68 | 71 | 88 | 86 | 80 | 73 | 70 | 68 | 63 |
| Alkali resistance (*10) | Δ | Δ | Δ | Δ | Δ | Δ-X | X | X | Δ |
| Gloss retention (%) after the alkali resistance test (*11) | 73 | 89 | 91 | 88 | 82 | 85 | 80 | 71 | 68 |
| Light transmittance (%) after the alkali resistance test (*12) | 65 | 68 | 89 | 88 | 78 | 71 | 68 | 63 | 61 |
| Thermal resistance (*13) | | Δ | Δ | ○ | Δ | Δ | Δ | ○-Δ | Δ-X |
| Hiding ratio (%) after the thermal resistance test (*14) | 96 | 83 | 63 | 90 | 70 | 90 | 91 | 96 | 78 |
| Washing resistance (*15) | Δ | Δ | Δ | Δ | Δ | Δ | Δ-X | Δ-X | Δ |
| Impact resistance (*16) | Δ | Δ | Δ | Δ | Δ | Δ-X | Δ-X | Δ-X | Δ-X |
| Weatherability (*17) | Δ | Δ | Δ | ○ | Δ | Δ | Δ | Δ | Δ |
| Accelerated weatherability (*18) | Δ | Δ | Δ | ○ | Δ | Δ | Δ | Δ | Δ |
| Solvent resistance (*19) | Δ | Δ-X | Δ | Δ | ○ | Δ | Δ | | Δ-X |
| Adhesion (*20) | X | Δ | Δ | Δ | ○-Δ | X | Δ | X | Δ |
| Film strength (kg/cm²) (*21) | 12 | 11 | 12 | 12 | 15 | 11 | 17 | 14 | 10 |

The properties of the coated films were measured by the following methods.

(*3): 60° Specular gloss

The coating composition was coated on a glass plate by using a 3-mil applicator, and dried at 25° C. and 65% RH for one day. The gloss was then measured by a Murakami-type glossmeter.

(*4): 45°/0° Gloss

The coating composition was coated on a hiding ratio testing paper by using a 6-mil applicator and dried at 25° C. and 65% RH for one day. The gloss of the paper was then measured by a Murakami-type glossmeter at an incidence angle of 45° and a reflecting angle of 0°.

(*5): Light transmittance of the coated film

Measured by a Murakami-type glossmeter on the coated film mentioned in (*3) above at an incidence angle of 90° and a reflecting angle of 0°.

(*6): Hiding ratio

The coated film mentioned in (*4) was used, and the gloss of the white and black portions were measured at 45°/0°. The hiding ratio was calculated as the ratio of these glosses in accordance with the following equation.

$$\text{Hiding ratio} = \frac{\text{Diffusion reflectance at 45°/0° of the coated film on a black portion}}{\text{Diffusion reflectance at 45°/0° of the coated film on a white portion}}$$

(*7): Water resistance

The coated film on the glass mentioned in (*3) was immersed in distilled water at 25° C. for 7 days, and then observed visually and rated on the following standard.

⊙ : No swelling nor blistering in the film.
○ : No swelling, but slight blistering in the film.
Δ: Swelling and slight blistering in the film.
X: Large swelling and much blistering in the film.

(*8): Gloss retention after the water resistance test

The gloss of the coated film after the test mentioned in (*7) was measured by a Murakami-type glossmeter (60°/60°), and the ratio of the measured gloss to the gloss mentioned in (*3) was calculated.

(*9): Light transmittance after the water resistance test

The light transmittance of the coated film after the test mentioned in (*7) was measured by a Murakami-type glossmeter (90°/0°), and the ratio of the measured transmittance to the transmittance mentioned in (*5) was calculated.

(*10): Alkali resistance The coated film on the glass mentioned in (*3) was immersed in a saturated Ca(OH)₂ solution containing 2% NaOH for 7 days. Then, the coated film was observed visually, and rated on the following standard.

○ : Swelling but no blistering in the film.
Δ: Swelling and slight blistering in the film.
X: Swelling large and much blistering in the film.

(*11): Gloss retention after the alkali resistance test

After the test mentioned in (*10), the coated film was dried for one day at 25° C. and 65% RH, and the gloss of the film was measured by a Murakami-type glossmeter (60°/60°). The ratio of the measured gloss to the gloss mentioned in (*3) was calculated.

(*12): Light transmittance after the alkali resistance test

The light transmittance of the coated film after the test mentioned in (*10) was dried for one day at 25° C. and 65% RH, and the light transmittance of the coated film was measured by a Murakami-type glossmeter (90°/0°). The ratio of the measured transmittance to the transmittance mentioned in (*5) was calculated.

(*13): Thermal resistance

The coated film formed on the glass plate in (*3) was placed in a constant temperature vessel kept at 100° C., and left to stand for one day. It was then placed indoors for one hour, and visually observed and rated on the following standard.
○ : No swelling nor blistering in the film.
Δ: No swelling but blistering in the film.
X: Swelling and blistering in the film.

(*14): Hiding ratio after the thermal resistance test

The coated film on the hiding ratio testing paper formed in (*4) above was put in a constant temperature vessel kept at 100° C. and left to stand for one day. Then, it was placed indoors for 3 hours, and the gloss of the coated film was measured by a Murakami-type glossmeter at 45°/0°, and the hiding ratio was calculated in accordance with the equation given in (*6).

(*15) Washing resistance

The coating composition was coated on a vinyl chloride resin sheet by using a 6-mil applicator, and dried for 3 days at 25° C. and 65% RH for 3 days. Then, it was washed with a Gardner washing resistance tester, and rated by visual observation on the following standard.
○ : No peeling of the film after more than 2000 cycles.
Δ : The film peeled after 1000 to 2000 cycles. X : The film peeled after less than 1000 cycles.

(*16): Impact resistance

The coating composition was coated on an SS41 steel sheet by using a 100-μm applicator, and dried for hours at 25° C. and 65% RH. The dried film was fixed to a steel stand, and a steel ball having a diameter of 25.4 mm was let fall onto the coated film from a height of 1 meter. The state of the coated film was visually observed, and rated on the following standard.
○: No breakage nor peeling of the film.
Δ: Slight breakage and peeling of the film.
X: Marked breakage and peeling of the film.

(*17): Weatherability

The coating composition was coated on a slate plate, and dried. After exposure for 6 months, the state of the coated film was observed visually and rated on the following standard.
○ : good
Δ: fair
X: poor (*18): Accelerated weatherability The coating composition was coated on a slate plate by a brush, and a mist was sprayed onto the coating for 18 minutes during each 120 minute period while light from a carbon arc lamp was irradiated on it. After irradiation for 10 days, the state of the coated film was observed visually and rated on the following standard.
○: good
Δ: fair
X: poor (*19): Solvent resistance The coated film on the glass plate prepared in (*3) above was dried for one day, then immersed in toluene at room temperature for 24 hours. It was observed visually, and rated on the following scale.
○: Swelling but not blistering in the film.
Δ: Swelling and slight blistering in the film.
X: Large swelling and much blistering in the film.

(*20): Adhesion

The coating composition prepared was coated twice (200 g/cm$^2$) on a flexible plate by a brush, and dried for 5 days. Cuts are provided by a razor on the surface of the dried film to form a pattern of many squares each side measuring 2 mm. Using a cellophane adhesive tape, a peeling test was carried out (JIS A-6910).

(*21) Film strength

A dumbbell No. 2 sample was prepared from a 0.5 mm coated film dried for 5 days, and evaluated by an autograph (20° C., 60% RH).

EXAMPLES 23–29

Coating compositions having a PVC of 30% and a (NV)v of 37% were prepared in the same manner as in Example 16 except that polymer particles Q-3, Q-8 and Q-9 were used as the white pigments in varying amounts optionally in combination with titanium dioxide R-930.

COMPARATIVE EXAMPLES 30–32

Coating compositions having a PVC of 30% and a (NV)v of 37% were obtained in the same manner as in Example 16 except that OP-62 (styrene/acrylic hollow resin latex with a particle diameter of 0.4 micrometer and an inside void diameter of 0.27 micrometer) and Spindrift [a dispersion of polyester-type polymer containing TiO$_2$ and minute pores (particle diameter 5 micrometers), a product of ICI DULLUX] were used in different amounts from those given in Table 9, and as required, titanium dioxide R-930 was also used.

COMPARATIVE EXAMPLE 33

A coating composition having a PVC of 0% and a (NV)v of 37% was prepared as in Example 16 except that the white pigment was not used and the amount of water in Table 9 was changed.

COMPARATIVE EXAMPLE 34

A coating composition having a (NV)v of 37% and a PVC of 15% was prepared in the same way as in Example 16 except that titanium dioxide alone was used as the white pigment and the amount of water was changed.

The coating compositions obtained in Examples 23 to 29 and Comparative Examples 30 to 34 were coated on paper substrates to a predetermined film thickness, and dried. The physical and chemical properties of the resulting coated film are shown in Table 11.

TABLE 11

|  | Example |  |  |  |  |  |  | Comparative Example |  |  |  |  |
|---|---|---|---|---|---|---|---|---|---|---|---|---|
|  | 23 | 24 | 25 | 26 | 27 | 28 | 29 | 30 | 31 | 32 | 33 | 34 |
| Polymer particles for white pigment | Q-3 | Q-3 | Q-3 | Q-8 | Q-8 | Q-9 | Q-9 | OP-62 | OP-62 | Spindrift | — | — |
| Inorganic white pigment | — | TiO$_2$ | TiO$_2$ | — | TiO$_2$ | — | TiO$_2$ | — | TiO$_2$ | — | — | TiO$_2$ |
| PVC % | 30 | 30 | 30 | 30 | 30 | 30 | 30 | 30 | 30 | 30 | 0 | 15 |
| (PVC)$_{pp}$ (*22) | 30 | 15 | 20 | 30 | 15 | 30 | 15 | 30 | 15 | 30 | 0 | 0 |
| (PVC)$_{TiO_2}$ (*23) | 0 | 15 | 10 | 0 | 15 | 0 | 15 | 0 | 15 | 0 | 0 | 15 |
| Average particle diameter of the polymer particles (μm) | 0.54 | 0.54 | 0.54 | 0.50 | 0.50 | 0.41 | 0.41 | 0.4 | 0.4 | 5 | — | — |
| Average inside void diameter of the polymer particles (μm) | 0.30 | 0.30 | 0.30 | 0.30 | 0.30 | 0.30 | 0.30 | 0.27 | 0.27 | Minute | — | — |
| (NV)v % | 37 |  |  |  |  |  |  |  |  |  |  |  |

TABLE 11-continued

| | Example | | | | | | | Comparative Example | | | | |
|---|---|---|---|---|---|---|---|---|---|---|---|---|
| | 23 | 24 | 25 | 26 | 27 | 28 | 29 | 30 | 31 | 32 | 33 | 34 |
| Properties of the coated film | | | | | | | | | | | | |
| 60° Specular gloss (glass plate) | 94 | 91 | 90 | 95 | 92 | 94 | 93 | 90 | 86 | 40 | 89 | 86 |
| Hiding ratio | 0.87 | 0.91 | 0.92 | 0.88 | 0.91 | 0.89 | 0.93 | 0.87 | 0.89 | 0.90 | 0.06 | 0.90 |
| Water resistance | O | O | O | O | O | O | O | Δ | Δ | Δ | O | O |
| Gloss retention (%) after the water resistance test | 94 | 93 | 93 | 96 | 95 | 93 | 92 | 87 | 88 | 80 | 92 | 90 |
| Alkali resistance | O | O | O | O | O | O | O | Δ | Δ | Δ | O | Δ |
| Gloss retention (%) after the alkali resistance test | 92 | 93 | 92 | 95 | 94 | 90 | 91 | 82 | 85 | 67 | 89 | 91 |
| Thermal resistance | O | O | O | O | O | O | O | Δ | Δ | O | O | Δ |
| Hiding ratio (%) after the thermal resistance test | 92 | 93 | 93 | 97 | 95 | 96 | 95 | 59 | 78 | 83 | 91 | 93 |
| Washing resistance | O | O | O | O | O | O | O | Δ | Δ | Δ | O | Δ |
| Impact resistance | O | O | O | O | O | O | O | Δ | Δ | X | O | Δ |
| Weatherability | O | O | O | O | O | O | O | Δ | Δ | Δ | O | O |
| Accelerated weatherability | O | O | O | O | O | O | O | Δ | Δ | Δ | O | O |
| Solvent resistance | O–Δ | O | O | O | O | O | O | X | Δ–X | Δ–X | Δ | Δ |

Note:
The meanings of the terms in the table are the same as in Tables 9 and 10.
(*22) $(PVC)_{pp}$ ... PVC of the polymer particles as the white pigment $$(PVC)_{pp} = \frac{\text{Volume of the polymer particles as the white pigment (dry)}}{\text{Volume of the white pigment} + \text{Volume of the film-forming resin (dry)}} \times 100$$

(*23) $(PVC)_{TiO_2}$ ... PVC of titanium oxide $$(PVC)_{TiO_2} = \frac{\text{Volume of TiO}_2 \text{ (dry)}}{\text{Volume of the white pigment} + \text{Volume of the film-forming resin (dry)}} \times 100$$

EXAMPLE

Example 30 AND COMPARATIVE EXAMPLES 35–37

Water-base coating compositions shown in Table 12 were prepared and coated on paper substrates. The properties of the resulting coated films were measured, and the results are shown in Table 12.

TABLE 12

| | Example | Comparative Example | | |
|---|---|---|---|---|
| | 30 | 35 | 36 | 37 |
| Hollow polymer particles Q-3 (*1) | 20 | 2 | 97 | 20 |
| Film-forming resin emulsion (*2) | 80 | 98 | 3 | 80 |
| Titanium dioxide (*3) | | | | 800 |
| Dispersing agent (*4) | | 2.4 | | 6.7 |
| Wetting agent (*4) | | 0.7 | | 2.0 |
| Thickening agent (*4) | | 2.8 | | 7.8 |
| Plasticizer (*4) | | 13.6 | | 38.1 |
| Defoaming agent (*4) | | 0.6 | | 1.68 |
| Freezing stabilizer (*4) | | 14.0 | | 39.2 |
| Aqueous ammonia (25%) | | 0.3 | | 0.8 |
| Water | 121.4 | 113.4 | 156.1 | 354.7 |
| (NV)v % | | 41 | | |
| PVC | 24.6 | 2.6 | 97.7 | 74.0 |
| $(PVC)_{pp}$ | 24.6 | 2.6 | 97.7 | 8.5 |
| $(PVC)_{TiO_2}$ | 0 | 0 | 0 | 65.5 |
| Properties of the coated film | | | | |
| 60° Specular gloss | 93 | 89 | 63 | 71 |
| Hiding ratio | 0.92 | 0.21 | 0.90 | 0.91 |
| Water resistance | O | O | Δ | X |
| Alkali resistance | O | O | Δ | X |
| Washing resistance | O | O | X | X |
| Impact resistance | O | O | X | X |

(*1) and (*2): Weight as solids
(*3): R-930 produced by Ishihara Sangyo Co., Ltd.
(*4): The same compounds as indicated in Table 9.

The above test results show the following facts.

Comparative Example 21 used the hollow prepolymer particles (P) of the invention without further coating their surface with another preferable polymer layer. The coated film had satisfactory hiding property. But the pre-polymer particles had inferior adhesion to the binder resin in the coating composition, and the coated film had poor water resistance, alkali resistance, weatherability, washing resistance, impact strength, adhesion and film strength.

Comparative Example 22 used polymer particles having small voids inside as a white pigment. The coated paper had poor hiding property. The polymer particles had low adhesion to the binder resin, and the coated film were inferior in all of the properties indicated in Table 10.

Comparative Example 23 used commercial polystyrene particles L-8801. The coated film had gloss, but was inferior in hiding property and resistance characteristics.

In Comparative Example 25, the inside diameter/outside diameter ratio of the hollow polymer particles was less than 0.2. The hiding property of the coated film was inferior.

In Comparative Example 26, the hollow polymer particles had a particle diameter of more than 20 micrometers. The polymerization stability was poor, and new particles occurred. The coated film had some hiding power but low gloss, and was inferior in resistance characteristics.

In Comparative Example 27, the polymer particles had a particle diameter of less than 0.15 micrometer. The polymerization stability was poor, and new particles occurred. The resistance characteristics of the coated film were very inferior.

In Comparative Example 28, the proportion of the toluene-insoluble portion of the hollow polymer particles exceeded 90%, and the hollow polymer particles had an MFR of less than 0.1 and an inside diameter/outside diameter ratio of more than 0.8. The coated film had inferior gloss, resistance characteristics and strength.

Comparative Example 29 used hollow polymer particles composed of an inside and an outside polymer layer of noncrosslinked polymers. The coated film had hiding property and gloss but was inferior in resistance characteristics.

Comparative Examples 24 and 34 used only titanium dioxide (R-930) as the white pigment. The coated film had excellent hiding property but was inferior in gloss, alkali resistance, thermal resistance and strength.

Comparative Examples 30 used OP-62 (a product of Rohm & Haas Co.) produced by the prior technique (IV) described hereinabove, as the white pigment. Comparative Example 31 used a combination of OP-62 and titanium dioxide. The polymer particles having voids therein produced by the technique (IV) had hiding property and gloss, but were inferior in resistance characteristics.

Comparative Example 32 used polyester-type polymer particles containing titanium dioxide particles and having an outside diameter of 5 to 10 micrometers with a number of fine pores inside. The coated film had excellent hiding property but very low gloss, and was inferior in resistance characteristics.

Comparative Example 33 did not use any white pigment. The coated film was nearly transparent, and did not have hiding property.

In Comparative Example 35, hollow polymer particles were used in an amount of not more than 3 parts by weight per 100 parts by weight of the hollow polymer particles and the film-forming binder combined. No sufficient hiding ratio could be obtained.

In Comparative Example 36, the hollow polymer particles were used in an amount of more than 95 parts by weight per 100 parts by weight of the hollow polymer particles and the film-forming binder combined. In Comparative Example 37, an inorganic filler ($TO_2$) was used in an amount of more than 700 parts by weight per 100 parts by weight of the hollow polymer particles and the film-forming binder combined. In both cases, the film-forming ability was very poor. The coated films had hiding property but were inferior in other properties.

(4) Production of hollow polymer particles (Q') and (R)

Q'-1 to 3 and Q'-6 and R-9 to R-13

These hollow polymer particles were produced in the same way as in the production of Q-1 except that the monomer composition was changed as indicated in Table 13. In the polymerization, the crosslinkable monomer (a1) was used.

Q'-4, 5, 7 and 8

These hollow polymer particles were produced in the same way as in the production of Q-4 except that the monomer composition was changed as indicated in Table 13. In the polymerization, the crosslinkable monomer (a1) was used.

Q'-9

The hollow polymer particles were produced in the same way as in the production of Q-9 except that the monomer composition was changed as indicated in Table 13.

The results are shown in Tables 13 and 14.

TABLE 13

| Polymer particles | | Q'-1 | Q'-2 | Q'-3 | Q'-4 | Q'-5 | Q'-6 | Q'-7 | Q'-8 | Q'-9 | R-9 | R-10 | R-11 | R-12 | R-13 |
|---|---|---|---|---|---|---|---|---|---|---|---|---|---|---|---|
| Hollow pre-polymer particles | | P-1 | P-11 | P-2 | P-3 | P-4 | P-10 | P-5 | P-6 | P-9 | P-13 | P-7 | P-8 | P-10 | P-12 |
| Amount of the hollow prepolymer particles (parts) | | 20 | 40 | 40 | 40 | 60 | 60 | 60 | 60 | 100 | 50 | 60 | 60 | 2500 | 40 |
| Monomer composition (m-2) | | | | | | | | | | | | | | | |
| (a1) | DVB | | 1.7 | | 1.7 | | | | | | 2.9 | 2.9 | | | |
| | EDMA | 5 | | 60 | | 10 | | 5 | 5 | | | | 15 | | |
| | TMPTMA | | | | | 5 | | 20 | | | | | | | 5 |
| (b1) | AN | | | | | 20 | | | | | 10 | | | | |
| | ST | 30 | 91 | | 72 | 50 | | | | 30 | 50 | 50 | | | |
| | Vinylpyridine | | 2 | | | | | | | | | | | 80 | |
| | Ethylvinyl-benzene | | 1.3 | | 1.3 | | | | | | 2.1 | 2.1 | | | |
| | N-methylol acrylamide | 1 | | | | | | | | | | | | | |
| | Vinyl chloride | | | | | | | 37 | | | | | | | |
| | Vinylidene fluoride | | | | | | | | | 10 | | | | | |
| | Vinyl acetate | | | | | | 25 | | | | | | | | |
| (c1) | AA | | | 5 | | | | | 5 | | 10 | | 8 | 4 | 3 |
| | MAA | 5 | 3 | 30 | 5 | 3 | 10 | | 6 | | | 5 | | 4 | 2 |
| | EA | | | | | | | | 10 | | 5 | | | 12 | |
| | BA | 5 | | 5 | | | | | | 5 | 10 | 10 | | | |
| | 2EHA | | | | | | 5 | | 25 | | | | | | 10 |
| | MMA | 54 | | | | 7 | 50 | | 40 | 54 | | | 75 | | 80 |
| | 2HEMA | | | | | | | 3 | 5 | | 10 | 30 | 2 | | |
| | Acrylic ester HH | | 1 | | 5 | | 40 | | | | | | | | |
| (d1) | BD | | | | 15 | 15 | | | | | | | | | |
| (emulsifier) | DBS | 0.3 | 0.3 | 0.4 | 0.5 | — | 1.5 | 0.3 | 0.6 | 0.7 | 0.6 | 0.5 | 0.5 | 4.5 | 1.0 |
| | POENPE | — | 0.6 | 0.1 | 0.1 | 0.5 | 0.3 | 0.1 | 0.1 | 0.1 | — | 0.1 | 0.1 | 2.0 | 0.5 |
| pH at the time of the emulsion polymerization | | 2.2 | 2.3 | 1.5 | 2.2 | 2.3 | 2.0 | 2.4 | 2.0 | 2.4 | 2.3 | 2.1 | 2.2 | 2.4 | 2.5 |
| Polmerization stability | | ○ | ○ | ○ | ○ | ○ | ○ | ○ | ○ | ○ | ○ | Δ | Δ | ○ | Δ-X |
| Occurrence of new particles | | No | No | No | No | No | No | No | No | No | No | No | No | Slight | Yes |
| Recurring units of | | | | | | | | | | | | | | | |

TABLE 13-continued

| Polymer particles | Q'-1 | Q'-2 | Q'-3 | Q'-4 | Q'-5 | Q'-6 | Q'-7 | Q'-8 | Q'-9 | R-9 | R-10 | R-11 | R-12 | R-13 |
|---|---|---|---|---|---|---|---|---|---|---|---|---|---|---|
| particles (Q') (a), (b), (c) and (d) | | | | | | | | | | | | | | |
| Component (a) % | 5.9 | 7.4 | 45.9 | 7.4 | 10.8 | 15.2 | 18.3 | 8.9 | 7.8 | 4.5 | 2.3 | 13.3 | 22.9 | 5.2 |
| Component (b) % | 28.3 | 75.7 | 4.6 | 60.1 | 55.3 | 17.1 | 31.2 | 14.5 | 22.4 | 52.7 | 62.1 | 6.1 | 7.0 | 12.9 |
| Component (c) % | 65.8 | 16.9 | 49.5 | 21.8 | 24.5 | 67.7 | 50.5 | 76.6 | 69.8 | 42.8 | 35.6 | 80.6 | 70.1 | 81.9 |
| Component (b) % | 0.0 | 0.0 | 0.0 | 10.7 | 9.4 | 0.0 | 0.0 | 0.0 | 0.0 | 0.0 | 0.0 | 0.0 | 0.0 | 0.0 |

TABLE 14

| Hollow crosslinked polymer particles | | Q'-1 | Q'-2 | Q'-3 | Q'-4 | Q'-5 | Q'-6 | Q-7 | Q'-8 | Q'-9 | R-9 | R-10 | R-11 | R-12 | R-13 |
|---|---|---|---|---|---|---|---|---|---|---|---|---|---|---|---|
| Properties of the particles | Particle diameter (micrometers) (**1) | 0.60 | 0.85 | 0.56 | 0.53 | 0.48 | 1.07 | 0.54 | 0.50 | 0.49 | 1.13 | 22 | 0.09 | 0.90 | 26 |
| | Inside diameter after drying (micrometers) (**2) | 0.30 | 0.25 | 0.30 | 0.30 | 0.30 | 0.81 | 0.30 | 0.30 | 0.30 | 0.08 | 9 | 0.05 | 0.81 | 6 |
| | Outside diameter (micrometers) (**2) | 0.60 | 0.83 | 0.55 | 0.51 | 0.47 | 1.05 | 0.52 | 0.49 | 0.48 | 1.09 | 22 | 0.09 | 0.90 | 25 |
| | Inside diameter/ outside diameter (ratio) | 0.50 | 0.30 | 0.55 | 0.59 | 0.64 | 0.77 | 0.58 | 0.61 | 0.63 | 0.07 | 0.41 | 0.56 | 0.88 | 0.24 |
| | Proportion of a toluene-insoluble portion (%) | 97 | 92 | 96 | 97 | 94 | 97 | 93 | 93 | 91 | 75 | 99 | 94 | 92 | 99 |
| | MFR | 0.03 | 0.03 | 0.01 | 0.03 | 0.02 | 0.02 | 0.01 | 0.03 | 0.04 | 0.09 | 0.05 | 0.04 | 1.5 | 0.01 |

(**1): Measured by using a particle size analyzer.
(**2): Measured by using a transmission-type electron microscope.

EXAMPLES 31-39 AND COMPARATIVE EXAMPLES 38-42

Coating compositions (solids content 62%) for gravure printing having the formulation shown in Table 5 were prepared by using various white pigments shown below.

In Examples 31 to 39, Q'-1 to Q'-9, which are the crosslinked hollow polymer particles of the invention, were used respectively as white pigments, and in Comparative Examples 38 to 42, R-9 to R-13, which are hollow polymer particles outside the scope of the invention, were used respectively as white pigments.

These coating compositions were coated on medium-quality base paper, and the properties of the coated papers were measured in the same way as in Example 1. The results are shown in Table 15.

EXAMPLES 40-45

Coating compositions (solids content 64%) for offset printing having the compositions shown in Table 16

TABLE 16

| | Example | | | | | |
|---|---|---|---|---|---|---|
| | 19 | 20 | 21 | 22 | 23 | 24 |
| Clay (UW-90) | 65 | 60 | 55 | 60 | 60 | 60 |
| Heavy calcium (Carbital 90, a product of Fuji Kaolin Industry Co., Ltd.) | 30 | 30 | 30 | 30 | 30 | 30 |
| Q-3 | 5 | 10 | 15 | | 5 | 5 |
| Q-4 | | | | 10 | | |
| Commercial polystyrene latex (L-8801, a product of Asahi Chemical Industry Co., Ltd.) | | | | | 5 | |
| Titanium dioxide (A-220, a product of Ishihara Sangyo Co., Ltd.) | | | | | | 5 |
| Dispersed type (Aron T-40, a product of Toa Synthetic Chemical Industry Co., Ltd.) | | | 0.2 | | | |
| Oxidized starch (Oji Ace B, a product of Oji Corn Starch Co., Ltd.) | | | 5 | | | |

TABLE 15

| | Dry pick | Wet pick | Gloss before printing | Gloss after printing | Whiteness | Opacity | Gravure printing adaptability |
|---|---|---|---|---|---|---|---|
| Example | | | | | | | |
| 31 | 4.1 | 4.2 | 83.1 | 86.4 | 84.4 | 86.3 | O |
| 32 | 4.1 | 4.2 | 83.2 | 86.4 | 84.3 | 86.0 | O |
| 33 | 4.7 | 4.8 | 83.2 | 86.5 | 84.2 | 86.2 | O |
| 34 | 4.9 | 4.8 | 83.2 | 86.3 | 84.0 | 86.1 | O |
| 35 | 4.7 | 4.6 | 83.3 | 86.3 | 84.3 | 86.3 | O |
| 36 | 4.5 | 4.3 | 82.3 | 85.1 | 84.7 | 86.5 | O |
| 37 | 4.6 | 4.6 | 83.1 | 85.9 | 84.4 | 85.9 | O |
| 38 | 4.3 | 4.5 | 83.1 | 85.5 | 84.1 | 85.7 | O |
| 39 | 4.1 | 4.0 | 83.6 | 86.6 | 84.7 | 86.5 | O |
| Comparative Example | | | | | | | |
| 38 | 3.6 | 2.7 | 78.7 | 82.3 | 82.2 | 83.8 | Δ |
| 39 | 3.0 | 1.3 | 77.0 | 82.4 | 83.4 | 85.5 | X |
| 40 | 4.2 | 3.7 | 79.2 | 83.2 | 82.8 | 83.9 | X |
| 41 | 2.8 | 2.4 | 77.4 | 82.6 | 84.4 | 86.5 | X |
| 42 | 3.2 | 2.3 | 75.9 | 82.3 | 82.4 | 83.5 | X |

TABLE 16-continued

|  | Example | | | | | |
|---|---|---|---|---|---|---|
|  | 19 | 20 | 21 | 22 | 23 | 24 |
| Binder latex (*) | | | 12 | | | |

(*): Pigment binder, a carboxy-modified styrene/butadiene copolymer latex (#0619, a product of Japan Synthetic Rubber Co., Ltd.)

COMPARATIVE EXAMPLES 43–44

Example 11 was repeated except that the amount of the pigment binder (latex) was changed to 2 parts (Comparative Example 43) and 40 parts (Comparative Example 44), respectively.

The resulting coating compositions were applied as in Example 10, and the properties of the coated papers were measured. The results are shown in Table 17.

TABLE 17

| Run | Dry pick | Wet pick | Gloss before printing | Gloss after printing | Whiteness | Opacity | Trapping property |
|---|---|---|---|---|---|---|---|
| Example | | | | | | | |
| 40 | 4.7 | 4.6 | 80.1 | 83.0 | 85.2 | 90.7 | ○ |
| 41 | 4.8 | 4.6 | 80.4 | 83.3 | 85.5 | 91.0 | ⊙ |
| 42 | 4.9 | 4.7 | 81.0 | 83.7 | 85.6 | 91.1 | ○ |
| 43 | 4.9 | 4.7 | 80.4 | 83.4 | 85.6 | 91.1 | ⊙ |
| 44 | 4.6 | 4.5 | 80.2 | 83.1 | 85.0 | 90.5 | ○ |
| 45 | 4.7 | 4.7 | 80.1 | 83.2 | 85.8 | 91.2 | ○ |
| Comparative Example | | | | | | | |
| 43 | 2.1 | 1.8 | 74.0 | 76.5 | 85.1 | 90.6 | X |
| 44 | Flowability was poor, and a uniform coated paper could not be prepared. | | | | | | |

The above test results show the following facts. In Comparative Example 38, the inside diameter/outside diameter of the hollow polymer particles was less than 0.2 The coated films had inferior whiteness and opacity. In Comparative Examples 39 and 42, the hollow polymer particles had a particle diameter of more than 20 micrometers. The polymerization stability was poor, and new particles occurred. The coated papers had inferior gloss and strength (dry pick and wet pick).

In Comparative Example 40, the polymer particles had a particle diameter of less than 0.15 micrometer. The polymerization stability was poor, and new particles were seen to occur. Accordingly, the coated paper had very inferior opacity, whiteness and gloss.

In Comparative Example 41, the inside/outside diameter ratio of the polymer particles was more than 0.8. The polymerization stability was poor, and new particles were seen to occur. The coated paper had very inferior gloss and strength.

In Comparative Example 43, the amount of the pigment binder used was less than 3 parts by weight per 100 parts by weight of the pigments. The coated paper has satisfactory whiteness and opacity, but was inferior in strength, gloss and printing adaptability.

In Comparative Example 44, the amount of the pigment binder used was more than 30 parts by weight per 100 parts by weight of the pigments. Since the viscosity of the coating composition was high, it was difficult to coat it uniformly on paper, and coated paper could not be prepared.

EXAMPLES 46–52 AND COMPARATIVE EXAMPLES 45–48

Coating compositions were prepared by using Q'-11 to Q'-3 and Q'-6 to Q'-9 in accordance with the formulation shown in Table 9.

The coating compositions were applied as in Example 16, and the properties of the coated films are shown in Table 18.

The properties given in Table 18 were measured in the same way as described after Table 10.

EXAMPLES 53–59

Coating compositions having a PVC of 30% and a (NV)v of 37% were prepared as in Example 16 using Q'-3, Q'-8 and Q'-9 as polymer particles, optionally together with titanium dioxide R-930, in accordance with the formulation shown in Table 9.

The properties of the coated films are shown in Table 19.

TABLE 18

|  | Example | | | | | | | Comparative Example | | | |
|---|---|---|---|---|---|---|---|---|---|---|---|
|  | 46 | 47 | 48 | 49 | 50 | 51 | 52 | 45 | 46 | 47 | 48 |
| White pigment | Q'-1 | Q'-2 | Q'-3 | Q'-6 | Q'-7 | Q'-8 | Q'-9 | R-9 | R-10 | R-11 | R-12 |
| Average particle diameter of the white pigment polymer particles (μm) | 0.60 | 0.83 | 0.55 | 1.05 | 0.52 | 0.49 | 0.48 | 1.09 | 22 | 0.09 | 0.90 |
| Average inside void diameter of the white pigment polymer particles (μm) | 0.30 | 0.25 | 0.30 | 0.81 | 0.30 | 0.30 | 0.30 | 0.08 | 9 | 0.05 | 0.81 |
| (NV)v % | | | | | | 41 | | | | | |
| PVC % | | | | | | 20 | | | | | |
| Properties of the coated film | | | | | | | | | | | |
| 60° Specular gloss (glass plate) (*3) | 89 | 90 | 90 | 89 | 91 | 90 | 91 | 85 | 78 | 87 | 86 |
| 45°/0° Gloss (hiding ratio testing paper) (*4) | 86 | 87 | 87 | 88 | 87 | 89 | 88 | 83 | 75 | 85 | 83 |
| Light transmittance (*5) | 3.4 | 3.6 | 2.9 | 2.9 | 3.0 | 3.2 | 3.1 | 41 | 5.3 | 6.3 | 3.9 |
| Hiding ratio (*6) | 0.89 | 0.90 | 0.91 | 0.90 | 0.90 | 0.91 | 0.89 | 0.69 | 0.85 | 0.80 | 0.85 |
| Water resistance (*7) | ○ | ○ | ○ | ○ | ⊙ | ⊙ | ○ | ○ | Δ-X | Δ-X | Δ |

TABLE 18-continued

|  | Example | | | | | | | Comparative Example | | | |
|---|---|---|---|---|---|---|---|---|---|---|---|
|  | 46 | 47 | 48 | 49 | 50 | 51 | 52 | 45 | 46 | 47 | 48 |
| Gloss retention (%) after the water resistance test (*8) | 93 | 94 | 89 | 88 | 98 | 99 | 94 | 84 | 90 | 85 | 75 |
| Light transmittance (%) after the water resistance test (*9) | 93 | 93 | 92 | 89 | 94 | 97 | 92 | 81 | 73 | 70 | 67 |
| Alkali resistance (*10) | ○ | ○ | ○ | ○ | ○ | ○ | ○ | Δ | Δ | Δ-X | Δ-X |
| Gloss retention (%) after the alkali resistance test (*11) | 93 | 91 | 87 | 84 | 93 | 96 | 89 | 83 | 85 | 80 | 70 |
| Light transmittance (%) after the alkali resistance test (*12) | 94 | 94 | 89 | 88 | 93 | 98 | 92 | 78 | 71 | 68 | 62 |
| Thermal resistance (*13) | ○ | ○ | ○ | ○ | ○ | ○ | ○ | Δ | Δ | Δ | ○-Δ |
| Hiding ratio (%) after the thermal resistance test (*14) | 96 | 97 | 94 | 94 | 97 | 99 | 98 | 71 | 90 | 91 | 96 |
| Washing resistance (*15) | ○ | ○ | ○ | ○ | ○ | ○ | ○ | Δ | Δ | Δ-X | Δ-X |
| Impact resistance (*16) | ○ | ○ | ○ | ○ | ○ | ○ | ○ | Δ | Δ | Δ | Δ |
| Weatherability (*17) | ○ | ○ | ○ | ○ | ○ | ○ | ○ | Δ | Δ | Δ | Δ |
| Accelerated weatherability (*18) | ○ | ○ | ○ | ○ | ○ | ○ | ○ | Δ | Δ | Δ | Δ |
| Solvent resistance (*19) | ○ | ○ | ○ | ○ | ○ | ○ | ○ | ○ | Δ | Δ | ○ |
| Adhesion (*20) | ○ | ○ | ○ | ○ | ○ | ○ | ○ | ○-Δ | X | Δ | X |
| Film strength (kg/cm$^2$) (*21) | 28 | 26 | 31 | 18 | 26 | 29 | 25 | 16 | 11 | 15 | 13 |

TABLE 19

|  | Example | | | | | | |
|---|---|---|---|---|---|---|---|
|  | 53 | 54 | 55 | 56 | 57 | 58 | 59 |
| Polymer particles for white pigment | Q'-3 | Q'-3 | Q'-3 | Q'-8 | Q'-8 | Q'-9 | Q'-9 |
| Inorganic white pigment | — | TiO$_2$ | TiO$_2$ | — | TiO$_2$ | — | TiO$_2$ |
| PVC % | 30 | 30 | 30 | 30 | 30 | 30 | 30 |
| (PVC)$_{pp}$ (*22) | 30 | 15 | 20 | 30 | 15 | 30 | 15 |
| (PVC)$_{TiO2}$ (*23) | 0 | 15 | 10 | 0 | 15 | 0 | 15 |
| Average particle diameter of the polymer particles (μm) | 0.55 | 0.55 | 0.55 | 0.49 | 0.49 | 0.48 | 0.48 |
| Average inside void diameter of the polymer particles (μm) | 0.30 | 0.30 | 0.30 | 0.30 | 0.30 | 0.30 | 0.30 |
| (NV)v % | | | | 37 | | | |
| Properties of the coated film | | | | | | | |
| 60° Specular gloss (glass plate) | 92 | 90 | 89 | 93 | 92 | 93 | 92 |
| Hiding ratio | 0.88 | 0.91 | 0.92 | 0.90 | 0.93 | 0.88 | 0.93 |
| Water resistance | ○ | | | ○ | ○ | ○ | ○ |
| Gloss retention (%) after the water resistance test | 95 | 94 | 93 | 97 | 96 | 94 | 94 |
| Alkali resistance | ○ | ○ | ○ | ○ | ○ | ○ | ○ |
| Gloss retention (%) after the alkali resistance test | 93 | 93 | 92 | 96 | 95 | 92 | 91 |
| Thermal resistance | ○ | ○ | ○ | ○ | ○ | ○ | ○ |
| Hiding ratio (%) after the thermal resistance test | 95 | 96 | 95 | 98 | 97 | 97 | 95 |
| Washing resistance | ○ | ○ | ○ | ○ | ○ | ○ | ○ |
| Impact resistance | ○ | ○ | ○ | ○ | ○ | ○ | ○ |
| Weatherability | ○ | ○ | ○ | ○ | ○ | ○ | ○ |
| Accelerated weatherability | ○ | ○ | ○ | ○ | ○ | ○ | ○ |
| Solvent resistance | ○ | ○ | ○ | ○ | ○ | ○ | ○ |

Note:
The meanings of the terms are the same as in Tables 9 and 10.

EXAMPLE 60 AND COMPARATIVE EXAMPLES 49–51

Coating compositions having the compositions shown in Table 20 were prepared, and coated on substrates. The properties of the coated films are measured. The results are shown in Table 20.

TABLE 20

|  | Example | Comparative Example | | |
|---|---|---|---|---|
|  | 30 | 49 | 50 | 51 |
| Hollow polymer particles Q-3 (*1) | 20 | 2 | 97 | 20 |
| Film-forming resin emulsion (*2) | 80 | 98 | 3 | 80 |
| Titanium dioxide (*3) |  |  |  | 800 |
| Dispersing agent (*4) |  | 2.4 |  | 6.7 |
| Wetting agent (*4) |  | 0.7 |  | 2.0 |
| Thickening agent (*4) |  | 2.8 |  | 7.8 |
| Plasticizer (*4) |  | 13.6 |  | 38.1 |
| Defoaming agent (*4) |  | 0.6 |  | 1.68 |
| Freezing stabilizer (*4) |  | 14.0 |  | 39.2 |
| Aqueous ammonia (25%) |  | 0.3 |  | 0.8 |
| Water | 121.4 | 113.4 | 156.1 | 354.7 |
| (NV)v % |  | 41 | | |
| PVC | 24.6 | 2.6 | 97.7 | 74.0 |
| (PVC)$_{pp}$ | 24.6 | 2.6 | 97.7 | 8.5 |
| (PVC)$_{TiO2}$ | 0 | 0 | 0 | 65.5 |
| Properties of the coated film | | | | |
| 60° Specular gloss | 91 | 87 | 62 | 70 |
| Hiding ratio | 0.92 | 0.22 | 0.90 | 0.90 |
| Water resistance | ○ | ○ | Δ | X |

TABLE 20-continued

|  | Example | Comparative Example | | |
|---|---|---|---|---|
|  | 30 | 49 | 50 | 51 |
| Alkali resistance | ○ | ○ | Δ | X |
| Washing resistance | ○ | ○ | X | X |
| Impact resistance | ○ | ○ | X | X |

(*1) and (*2): Weight as solids
(*3): R-930 produced by Ishihara Sangyo Co., Ltd.
(*4): The same compounds as indicated in Table 9.

The above test results show the following facts.

In Comparative Example 45, the inside diameter/outside diameter ratio of the hollow polymer particles was less than 0.2. The coated film had inferior hiding property.

In Comparative Example 46, the particle diameter of the hollow polymer particles was more than 20 micrometer. The polymerization stability was poor, and new particles occurred. The coated film had some hiding property but low gloss, and was inferior in resistance characteristics.

In Comparative Example 47, the particle diameter of the polymer particles is less than 0.15 micrometer. The polymerization stability was poor, and new particles were seen to occur. The coated film was very inferior in resistance characteristics.

In Comparative Example 48, the inside diameter/outside diameter ratio of the hollow polymer particles exceeded 0.8. The polymerization stability was poor and new particles were seen to occur. The coated film had inferior gloss, resistance characteristics and strength.

In Comparative Example 49, the amount of the hollow polymer particles used was less than 3 parts by weight per 100 parts by weight of the hollow polymer particles and the film-forming binder combined. No sufficient hiding ratio was obtained.

In Comparative Example 50, the amount of the hollow polymer particles used was more than 95 parts by weight per 100 parts by weight of the hollow polymer particles and the film-forming binder combined. In Comparative Example 51, an inorganic filler ($TiO_2$) was used in an amount of more than 700 parts by weight per 100 parts by weight of the hollow polymer particles and the film-forming binders combined. In either case, the coating compositions had very poor film-forming ability. The coated papers had hiding property, but were inferior in other film properties.

Effects of the Invention (A) The hollow polymer particles of this invention are a novel industrially useful material which has highly crosslinked firm inside polymer layer and central voids with a favorable particle surface polymer layer. This material has excellent whiteness, light weight, adhesion, hiding property, thermal resistance, safety and solvent resistance. It can be used as dried hollow particles or an aqueous dispersion of the hollow particles dispersed stably in water. These hollow polymer particles can be used as paints, pigments for cosmetics, materials for slow releasing of drugs by including the drugs in their inside voids, mold-proofing paints, and anticorrosive paints. They can also be used as thermal insulating materials and dew-formation preventing paint by utilizing air in the inside voids.

(B) A paper coating composition containing the hollow polymer particles of this invention can achieve a well-balanced improvement in whiteness, opacity, strength, gloss and printing adaptability.

The paper coating composition has good coating operability and drying property, and can give coated paper which is light in weight and has excellent gloss, whiteness, opacity and printing adaptability in gravure and offset printing.

(C) A general-purpose coating composition comprising the hollow polymer particles of this invention gives a coated film having excellent hiding property, gloss, water resistance, alkali resistance, thermal resistance and solvent resistance. It has excellent handlability and stability and can give light coated film. In particular, when the hollow polymer particles are used as a pigment for a water-base paint, there can be formed a water-base coating composition in which the hollow polymer particles have good miscibility with, and adhesion to, other components. When the hollow polymer particles are reduced to a powder, they can also be used as a pigment for solvent-base paints.

We claim:

1. Hollow polymer particles having at least two polymer layers, wherein
   (1) the particles have an average particle diameter in the range of 0.15 to 20 micrometers,
   (2) each of the particles has an average equivalent hollow diameter/equivalent particle diameter in the range of 0.2 to 0.8,
   (3) the proportion of a toluene-insoluble portion of the particles is 20 to 90% by weight,
   (4) the polymer particles have a melt flow rate at 180° C. under 10 $kgf/cm^2$ of 0.1 to 1 g/10 min.,
   (5) the inside layer of the two polymer layers is composed of a crosslinked polymer composed of
   (a) recurring units represented by the following formula

(a)

wherein $R^1$ represents a hydrogen atom or a methyl group, X represents an n-functional organic group or a bond, and n is a number of 2 or 3, provided that n $R^1$'s may be identical or different and when X is a bond, n is 2, 1

(b) recurring units represented by the following formula

(b)

wherein $R^2$ represents a hydrogen atom or a methyl group, and Y represents a phenyl group, a phenyl group substituted by halo, alkyl or vinyl, a halogen atom, a cyano group, an alkanoyloxy group having 1 to 18 carbon atoms, an alkoxy group, a pyridyl group, a pyridylalkyl group, an aminoalkoxy group or an amide group, (c) recurring units represented by the following formula

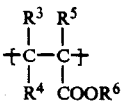
(c)

wherein $R^3$ and $R^5$ are identical or different, and each represents a hydrogen atom or a methyl group, $R^4$ represents a hydrogen atom, a carboxyl group or a carboxylate group, and $R^6$ represents a hydrogen atom, an alkyl group having 1 to 18 carbon atoms, a hydroxyalkyl group having 2 to 10 carbon atoms, an organic group containing at least one member selected from a glycidyl group, an amino group, a cyano group and a carbon-carbon double bond, or one equivalent of a cation group, and (d) optionally, recurring units represented by the following formula

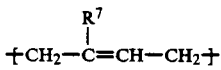
(d)

wherein $R^7$ represents a hydrogen atom or a methyl group, and (6) the outside layer of the two polymer layers is composed of a non-crosslinked polymer composed of at least one type of recurring units selected from the recurring units of formulae (b), (c) and (d).

2. The hollow polymer particles of claim 1 in which the outside polymer layer has a glass transition temperature of 40° to 150° C.

3. The hollow polymer particles of claim 1 in which the glass transition temperature of the inside polymer layer does not exist at 150° C. or below.

4. The hollow polymer particles of claim 1 in which the inside polymer layer is composed of a crosslinked polymer consisting of 1 to 80% by weight of the recurring units (a), 20 to 99% by weight of the hydrophilic recurring units selected from the recurring units (b) and recurring units (c) and 0 to 70% by weight of other copolymerizable recurring units selected from the nonhydrophilic recurring units of (b) or (c) and the recurring units (d), the proportions being based on the total weight of the recurring units (a), (b), (c) and (d).

5. The hollow polymer particles of claim 1 in which the outside polymer layer is composed of a noncrosslinked polymer consisting of 0 to 99.5% by weight of the recurring units (b), 0.5 to 100% by weight of the recurring units (c) and 0 to 80% by weight of the recurring units (d), proportions being based on the total weight of the recurring units (b), (c) and (d).

6. The hollow polymer particles of claim 1 in which the outside polymer layer is composed of a noncrosslinked polymer containing 0.5 to 50% by weight of recurring units of formula (c) in which $R^6$ is a hydrogen atom and/or $R^4$ is a carboxyl group.

7. The hollow polymer particles of claim 1 in which the outside polymer layer is composed of a noncrosslinked polymer containing 20 to 99.5% by weight of recurring units of formula (b) in which Y is a phenyl group or an alkyl-substituted phenyl group.

8. The hollow polymer particles of claim 1 in which the polymer components constituting the hollow polymer particles have a portion soluble in tetrahydrofuran, and contains 1 to 80% by weight, based on the total weight of the portion dissolved in tetrahydrofuran, of a component having a number average molecular weight of 700 to 20,000 in the molecular weight distribution of the tetrahydrofuran-soluble portion measured by high-performance liquid chromatography for its tetrahydrofuran solution.

9. The hollow polymer particles of claim 1 in which the proportion of the inside polymer layer is 5 to 2000 parts by weight per 100 parts by weight of the outside polymer layer.

10. Hollow crosslinked polymer particles having at least two polymer layers, wherein
   (1) the particles have an average particle diameter in the range of 0.15 to 20 micrometers,
   (2) each of the particles has an average equivalent hollow diameter/equivalent particle diameter in the range of 0.2 to 0.8,
   (3) the proportion of a toluene-insoluble portion of the particles exceeds 85% by weight,
   (4) the melt flow rate of the polymer particles at 180° C. under 10 kgf/cm² is less than 0.2 g/10 min.,
   (5) the inside layer of the two polymer layers is composed of a crosslinked polymer having the same composition as the crosslinked polymer constituting the inside polymer layer of claim 1, and
   (6) the outside layer is composed of a cross-linked polymer consisting of at least the recurring units of formula (a) in claim 1 and optionally recurring units selected from the recurring units of formulae (b), (c) and (d) in claim 1.

11. The hollow crosslinked polymer particles of claim 10 in which the inside polymer layer is composed of a crosslinked polymer consisting of 1 to 80% by weight of the recurring units (a), 20 to 99% by weight of hydrophilic recurring units selected from the recurring units (b) and (c), and 0 to 70 parts by weight of other copolymerizable recurring units selected from the nonhydrophilic recurring units (b) or (c) and the recurring units (d), the proportions being based on the total weight of the recurring units (a), (b), (c) and (d).

12. The hollow crosslinked polymer particles of claim 10 in which the outside polymer layer is composed of a crosslinked polymer consisting of 0.5 to 99.5% by weight of the recurring units (a), 0 to 99.5% by weight of the recurring units (b), 0.5 to 99.5% by weight of the recurring units (c), and 0 to 80% by weight of the recurring units (d), the proportions being based on the total weight of the recurring units (a), (b), (c) and (d).

13. The hollow crosslinked polymer particles of claim 10 in which the outside polymer layer is composed of a crosslinked polymer containing 0.5 to 50% by weight of the recurring units of formula (c) in which $R^6$ is a hydrogen atom and/or $R^4$ is a carboxyl group.

14. The hollow crosslinked polymer particles of claim 10 in which the outside polymer layer is composed of a crosslinked polymer containing 20 to 99.5% by weight of the recurring units of formula (b) in which Y is a phenyl group or an alkyl-substituted phenyl group.

15. The hollow crosslinked polymer particles of claim 10 in which the polymer components have a portion soluble in tetrahydrofuran, and contains 20 to 95% by weight, based on the total weight of the portion dissolved in tetrahydrofuran, of a component having a number average molecular weight of 700 to 20,000 in the molecular weight distribution of the tetrahydrofuran-soluble portion measured by high-performance liquid chromatography for its tetrahydrofuran solution.

16. The hollow crosslinked polymer particles of claim 10 in which the proportion of the inside polymer layer is 5 to 2000 parts by weight per 100 parts by weight of the outside polymer layer.

17. A process for producing the hollow polymer particles of claim 1, which comprises subjecting (A) hollow pre-polymer particles having an average particle diameter in the range of 0.05 to 15 micrometers and the same composition as the crosslinked polymer constituting the inside polymer layer of the hollow polymer particles of claim 1, and (B) a monomer represented by the following formula (b1)

wherein $R^2$ represents a hydrogen atom or a methyl group, and Y represents a phenyl group, a phenyl group substituted by halo, alkyl or vinyl, a halogen atom, a cyano group, an alkanoyloxy group having 1 to 18 carbon atoms, an alkoxy group, a pyridyl group, a pyridylalkyl group, an aminoalkoxy group or an amide group, a monomer represented by the following formula (c1)

wherein $R^3$ and $R^5$ are identical or different, and each represents a hydrogen atom or a methyl group, $R^4$ represents a hydrogen atom, a carboxyl group or a carboxylate group, and $R^6$ represents a hydrogen atom, an alkyl group having 1 to 18 carbon atoms, a hydroxylalkyl group having 2 to 10 carbon atoms, an organic group having at least one member selected from glycidyl, amino, cyano and a carbon-carbon double bond, or one equivalent of a cation group, and optionally a monomer represented by the following formula (d1)

$$CH_2=CR^7—CH=CH_2 \quad (d1)$$

wherein $R^7$ represents a hydrogen atom or a methyl group, to polymerization in the presence of not more than 5 parts by weight, per 100 parts by weight of the hollow pre-polymer particles (A) and the monomers (b), of an emulsifying agent and/or a dispersing agent in an aqueous medium to form a polymeric film of the monomers (B) on the surface of the hollow pre-polymer particles (A) and to form hollow polymer particles having an average particle diameter of 0.15 to 20 micrometers.

18. The process of claim 17 in which the polymerization is carried out at a pH of less than 7.

19. The process of claim 17 in which the hollow pre-polymer particles are produced by polymerizing a monomeric mixture composed of a monomer represented by the following formula (a1)

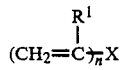

wherein $R^1$, X and n are as defined in claim 1, a monomer represented by the above formula (b1), a monomer represented by the above formula (c1) and optionally a monomer represented by the above formula (d1) in an aqueous medium in the presence of other polymer particles (S) having a different composition from the copolymer derived from this monomeric mixture, the proportion of the other polymer (S) particles being 1 to 100 parts by weight per 100 parts by weight of the monomeric mixture.

20. A process for producing the hollow crosslinked polymer particles of claim 10, which comprises subjecting (A) hollow pre-polymer particles having an average particle diameter in the range of 0.05 to 15 micrometers and the same composition as the crosslinked polymer constituting the inside polymer layer of the hollow polymer particles of claim 1, and (B) a monomer represented by the following formula (a1)

wherein $R^1$ represents a hydrogen atom or a methyl group, and X represents an n-functional organic group or a bond, and n is a number of 2 or 3, provided that n $R^1$'s may be identical or different and when X is a bond, n is 2, and optionally at least one of the monomers of formulae (b1), (c1) and (d1) of claim 3 to polymerization in an aqueous medium in the presence of not more than 5 parts by weight, per 100 parts by weight of the hollow prepolymer particles (A) and the monomers (B), of an emulsifying agent and/or a dispersing agent to form a polymeric film of the monomers (B) on the surface of the hollow pre-polymer particles (A) and to form hollow crosslinked polymer particles having an average particle diameter of 0.15 to 20 micrometers.

21. The process of claim 20 in which the polymerization is carried out at a pH of less than 7.

22. The process of claim 1 in which the hollow pre-polymer particles are produced by polymerizing a monomeric mixture composed of the monomers of above formulae (a1), (b1) and (c1) and optionally the monomer of the above formula (d1) in an aqueous medium in the presence of other polymer (S) particles having a different composition from the copolymer of the monomeric mixture, the proportion of the other polymer (S) particles being 1 to 100 parts by weight per 100 parts of the monomeric mixture.

23. A pigment comprising the hollow polymer particles of claim 1 or the hollow crosslinked polymer particles of claim 10.

24. A paper coating composition comprising the hollow polymer particles of claim 1 or 10, a mineral inorganic pigment and a pigment binder, the hollow polymer particles accounting for 1 to 50% by weight of the total weight of the hollow polymer particles and the mineral inorganic pigment, and the proportion of the pigment binder being 3 to 30 parts by weight per 100 parts by weight of the hollow polymer particles and the mineral inorganic pigment combined.

25. The paper coating composition of claim 24 which further comprises non-hollow polymer particles in an amount of not more than 25% by weight based on the total weight of the hollow polymer particles, the mineral inorganic pigment and the non-hollow polymer particles combined.

26. A general-purpose coating composition comprising 3 to 95 parts by weight of the hollow polymer particles of claim 1 or 10, 5 to 97 parts by weight of a pigment binder and 0 to 700 parts by weight, per 100 parts by weight of the hollow polymer particles and the pigment binder combined, of an inorganic filler.

27. Use of the hollow polymer particles of claim 1 or claim 10 as a pigment.

* * * * *